United States Patent
Junod, II et al.

(10) Patent No.: US 10,803,044 B1
(45) Date of Patent: Oct. 13, 2020

(54) TECHNICAL DATA FLEXIBILITY INDEX

(71) Applicants: Louis John Junod, II, Rockville, MD (US); Thomas Phillip Deuell, Jr., Barhamsville, VA (US)

(72) Inventors: Louis John Junod, II, Rockville, MD (US); Thomas Phillip Deuell, Jr., Barhamsville, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 217 days.

(21) Appl. No.: 15/913,658

(22) Filed: Mar. 6, 2018

Related U.S. Application Data

(60) Provisional application No. 62/468,256, filed on Mar. 7, 2017.

(51) Int. Cl.
*G06F 16/00* (2019.01)
*G06F 16/22* (2019.01)

(52) U.S. Cl.
CPC ................ *G06F 16/2291* (2019.01)

(58) Field of Classification Search
CPC .................................... G06F 16/2291
USPC ........................... 707/741; 715/234
See application file for complete search history.

(56) References Cited

U.S. PATENT DOCUMENTS

| | | | |
|---|---|---|---|
| 5,613,100 A | 3/1997 | Anezaki | |
| 5,732,213 A | 3/1998 | Gessel et al. | |
| 5,796,955 A | 8/1998 | Takahashi et al. | |
| 6,377,992 B1 | 4/2002 | Plaza Fernandez et al. | |
| 6,782,004 B1 | 8/2004 | Brusilovsky et al. | |
| 7,092,552 B2 | 8/2006 | Harrington et al. | |
| 7,895,256 B2 | 2/2011 | Zombek et al. | |
| 9,473,567 B2 | 10/2016 | Parikh et al. | |
| 2005/0096938 A1* | 5/2005 | Slomkowski | G06F 21/34 705/51 |
| 2006/0031114 A1* | 2/2006 | Zommers | G06F 16/9535 705/7.24 |

(Continued)

OTHER PUBLICATIONS

Tammy Halter, "A Pragmatic Approach to Implementing S1000," Whitepaper, 10 pages, © 2013 Adobe Systems Incorporated, 345 Park Avenue, San Jose, CA, XXXXXXXX 3/13, www.adobe.com.

(Continued)

*Primary Examiner* — Chelcie L Daye
(74) *Attorney, Agent, or Firm* — Howard Kaiser

(57) ABSTRACT

An exemplary embodiment of the present invention indexes components of a systematization of technical data. An author, a publisher, and a renderer are defined. The author, the publisher, and the renderer are relatedly configured in the technical data system so that the author represents a first stage, the publisher represents a second stage, and the renderer represents a third stage. The author creates and outputs author data, which is input into and implemented by the publisher. The publisher creates and outputs publisher data, which is input into and implemented by the renderer. The renderer creates and outputs renderer data, which is input into and implemented by a user. Respective levels of data are determined at the three stages. A first-stage level of data corresponds to the author data. A second-stage level of data corresponds to the publisher data. A third-stage level of data corresponds to the renderer data.

20 Claims, 20 Drawing Sheets

(56) References Cited

U.S. PATENT DOCUMENTS

| | | | |
|---|---|---|---|
| 2008/0141117 A1* | 6/2008 | King | G06F 16/335 |
| | | | 715/238 |
| 2010/0031137 A1* | 2/2010 | Amaral | G06F 16/972 |
| | | | 715/234 |

OTHER PUBLICATIONS

"OSI model," Wikipedia, https://en.wikipedia.org/wiki/OSI_model, 7 pages, available online and printed out on May 4, 2020.

"Content management," Wikipedia, https://en.wikipedia.org/wiki/Content_management_model, 5 pages, available online and printed out on May 4, 2020.

"Single-source publishing," Wikipedia, https://en.wikipedia.org/wiki/Single-source_publishing, 3 pages, available online and printed out on May 4, 2020.

* cited by examiner

| | 0 | 1 | 2 | 3 | 4 | 5 | 6 | 7 |
|---|---|---|---|---|---|---|---|---|
| Author | A0 Commenced | A1 Explained | A2 Labeled | A3 Linked | A4 Allocated (Layered) | A5 Piped | A6 Coded | A7 Choreographed |
| Think/Invent/Establish/Need | | | | | | | | |

FIG. 4

| Render | |
|---|---|
| R0 Immovable | 0 |
| R1 Scrollable | 1 |
| R2 Searchable | 2 |
| R3 Selectable | 3 |
| R4 Configurable | 4 |
| R5 Controllable | 5 |
| R6 Collaborative | 6 |
| R7 Performable | 7 |

User

Publisher

FIG. 6

| Author | | Publisher | | Render | User |
|---|---|---|---|---|---|
| A0 Commenced | 0 | P0 Preserver | 0 | R0 Immovable | |
| A1 Explained | 1 | P1 Converter | 1 | R1 Scrollable | |
| A2 Labeled | 2 | P2 Discoverer | 2 | R2 Searchable | |
| A3 Linked | 3 | P3 Arranger | 3 | R3 Selectable | |
| A4 Allocated (Layered) | 4 | P4 Discarder | 4 | R4 Configurable | |
| A5 Piped | 5 | P5 Director | 5 | R5 Controllable | |
| A6 Coded | 6 | P6 Facilitator | 6 | R6 Collaborative | |
| A7 Choreographed | 7 | P7 Producer | 7 | R7 Performable | |
| Think/ Invent/ Establish/ Need | | | | | |

FIG. 7

TECHNICAL DATA FLEXIBILITY INDEX

CROSS-REFERENCE TO RELATED APPLICATIONS

This application claims the benefit of U.S. provisional patent application No. 62/468,256, filed 7 Mar. 2017, hereby incorporated herein by reference, entitled "Technical Data Flexibility Index," inventors Louis John Junod, II and Thomas Philip Deuell, Jr.

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to content management and information systems, more particularly to methods and systems for managing (e.g., defining, organizing, cataloging) technical data such as technical documentation involving electronic publishing.

In current-day publishing a "functionality matrix" is often used to catalog the possible and desired features in an electronic publishing system, with emphasis on the usability of the published result. See, e.g., Tammy Halter, "A Pragmatic Approach to Implementing S1000D," Whitepaper, Adobe Systems Incorporated, 345 Park Avenue, San Jose, Calif., 2013 (10 pages). Prior to advent of the functionality matrix, a set of IETM Classes was used to define the spectrum of electronic technical manuals. Interactive Electronic Technical Manual (IETM) is technical documentation in digital form designed for screen display.

The manner in which structured electronic technical information is constructed versus its resultant presentation forms has long been a topic of heated technical discussions by specialists who possess a detailed understanding of the publishing process flow. These specialists have come to term electronic technical documents as either "linear" or "non-linear," and as "Electronic Technical Manuals (ETMs)" or "Interactive Electronic Technical Manuals (IETMs)." See, e.g., the following United States Department of Defense (DOD) IETM Specifications: MIL-D-87269, 20 Nov. 1992, Revisable Interactive Electronic Technical Manuals, for the Support of, and MIL-M-87268, 20 Nov. 1992, Interactive Electronic Technical Manuals General Content, Style, Format, and User-Interaction Requirements.

SUMMARY OF THE INVENTION

Exemplary practice of the present invention is referred to herein as the "Technical Data Flexibility Index" (acronymously, "TDFI" or "TD Flex" or "TD Flexibility Index"). The inventive TDFI is used to evaluate the impact of a change from one stage to another stage of a three-stage technical data (TD) production and fielding system, including the ripple impact to the other two stages of the inventive TD system. An exemplary inventive TD system is divided into three stages, viz., (1) an authoring approach, (2) a publishing choice, and (3) a rendering method.

Exemplary inventive practice provides an index that is used to evaluate the impact of a change from one stage to another stage of the technical data (TD) production and fielding system. The resulting index can also be used to as a means to compare different TD development, composing, publishing, and rendering systems. The present invention provides the means to disambiguate linear and non-linear technical information, e.g., the means to disambiguate between finer levels than the traditional categories of linear and non-linear technical information. The present invention's TD Flexibility Index quantifies the components that a system embodies at each of the three stages.

The present invention features, inter alia, quantification of the composing, formatting, and rendering of a technical idea or technical information. Currently, a functionality matrix is often used to catalog the possible and desired features in an electronic publishing system with emphasis on the usability of the published result. Prior to the functionality matrix, a set of IETM Classes (See, e.g., Eric L. Jorgensen, DoD CLASSES OF ELECTRONIC TECHNICAL MANUALS, Carderock Division, Naval Surface Warfare Center, 5 Apr. 1994) was used to define the spectrum of electronic technical manuals.

Today, a "functionality matrix" is often used to catalog the features possible and desired in an electronic publishing system with emphasis on the usability of the published result. Prior to the functionality matrix, a set of IETM Classes was used to define the spectrum of electronic technical manuals.

As exemplarily embodied, the present invention (sometimes referred to by the present inventors as "TDFI" or "TD Flex") is a mechanism that may be used prior to employing a functionality matrix. The present invention differs from previous methods by, inter alia, using quantifiable communication technology maturity milestones as metrics for creating the inventive Technical Data Flexibility Index. The maturation of communications technology in general is illustrated, for instance, by comparison of a caveman's wall painting with an electronic billboard displaying changing advertisements. Exemplary practice of the present invention bears some similarity to the Open Systems Interconnection (OSI) model, shown in FIG. 1.

In contrast to the OSI, however, the goal of the present invention is to provide a conceptual model that standardizes three characteristic stages, viz., authoring, publishing, and rendering. Exemplary inventive practice further develops a methodology for determining and using an index. An exemplary inventive embodiment includes a handbook, an implementation guide, a quick reference guide, a curriculum, a certification, and other promulgation. The present invention creates and collects example use cases and case studies to further refine the application of the index in a formalized manner that can be established as a certified professional approach in the use of the index.

BRIEF DESCRIPTION OF THE DRAWINGS

The present invention will now be described, by way of example, with reference to the accompanying drawings, wherein like numbers indicate same or similar parts or components, and wherein:

FIG. 4 is a table showing an example of the authoring index levels in accordance with the present invention. Eight authoring index levels are shown in FIG. 4.

FIG. 6 is a table showing an example of the rendering index levels in accordance with the present invention. Eight rendering index levels are shown in FIG. 6.

FIG. 7 is a table showing, in condensed fashion, an example of the present invention's Technical Data Flexibility Index. Shown juxtaposed are the eight levels of authoring, publishing, and rendering, respectively.

DESCRIPTION OF EXEMPLARY EMBODIMENTS OF THE INVENTION

Figure 2:
FIG. 2 is a diagram illustrating an example of components of the design for the present invention's Technical Data Flexibility Index.

Referring to FIG. 2, the present invention's Technical Data Flexibility Index ("TDFI" or "TD Flex"), as frequently embodied, is used to evaluate the impact of a change from one stage to another stage of a technical data (TD) production and fielding system that is broken into three stages, namely, (1) an authoring approach, (2) a publishing choice, and (3) a rendering method.

In accordance with exemplary practice of the present invention, the evaluated impact includes the ripple impact, associated with a change to a stage, with respect to the other two stages of the TD system. The resulting index can also be used as a means to compare different TD development, composing, publishing, and rendering systems. The present invention provides the means to disambiguate linear and non-linear technical information.

The present invention's TD Flexibility Index is based on three stages, viz., Authoring, Publishing, and Rendering. While these three stages are usually separate and distinct, two or more stages may co-exist. For instance, authored material may be provided to a publisher/renderable combination component. Likewise, an authored/published combination component can be rendered. Accordingly, a hybrid of two or all three stages can be created; however, within the hybrid, the index of the virtual stage can be imputed.

Figure 3:
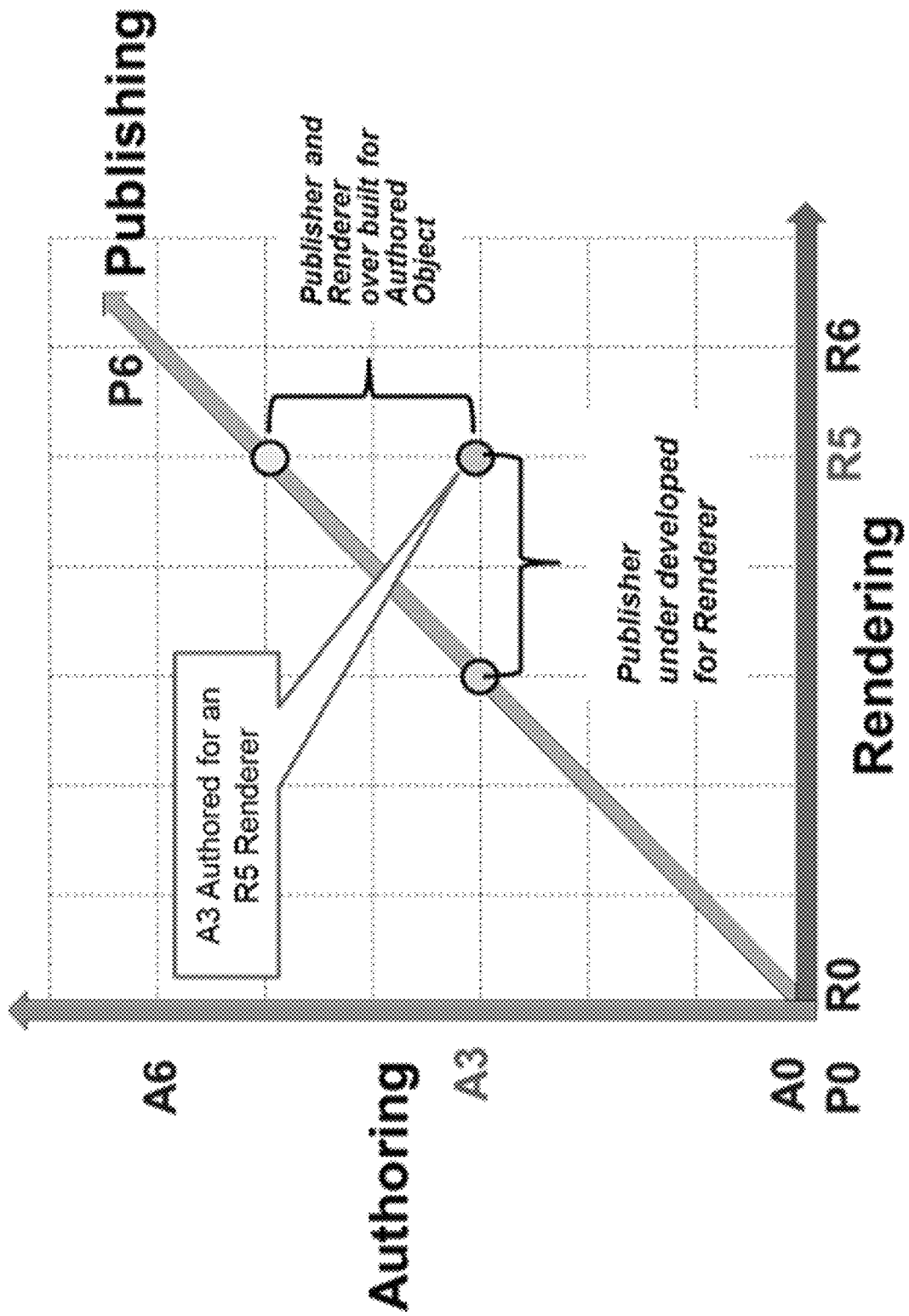
FIG. 3 is a graph illustrating an example of the present invention's Technical Data Flexibility Index. The inventive TD Flexibility Index is graphed showing Authoring, Rendering, and Publishing.

The inventive TD Flexibility Index quantifies the components that a TD development, composing, publishing and rendering system embodies at each of the three stages of (1) an authoring approach, (2) a publishing choice, and (3) a rendering method. Referring to FIG. 3, existing systems can be quantified and assessed as to the percentage for each index of the three stages. Realizing that authored materials may be at, above, or below the other two indices can provide insight into whether the adoption of a particular renderer or publisher to increase (or decrease) the features anticipated by change.

The present invention, in principle, bears some similarity to electric circuits described with impedance (e.g., resistance and reactance) and admittance (e.g., conductance, susceptance), particularly insofar as determining matching between entities. The present invention features, inter alia, a determination of an amount of match in coupling between the Authoring stage and the Publishing stage, and a determination of an amount of match in coupling between the Publishing stage and the Rendering stage. Accordingly, the present invention provides an analytical methodology for determining the utilizations of the tools provided by each of the three stages (i.e., Author, Publisher, and Renderer).

In accordance with exemplary inventive practice, a publisher can handle all authored materials at or below its rating. However, materials authored at level zero, A0, will not be permanent unless the renderer is at level zero, R0. If the publisher receives materials above its rating, the material is unpublishable. It is noted that, if a P3 publisher has been adjusted to publish A4 materials, then it actually is a virtual P4 publisher and should be treated as a P4 publisher for purposes of the Technical Data Flexibility Index publishing level.

Author(ed) Index (A Levels—"-eds")

The authoring index levels (See FIG. 4 and Table 1, below) are based on the process of generating technical content material. The technical content material can be authored in one continuous piece or as a set of pieces wrought simultaneously by multiple authors. Simultaneous authoring requires authors to use a prearranged, standardized, naming convention.

Publish(er) Index (P Levels—"-ers")

Figure 5:
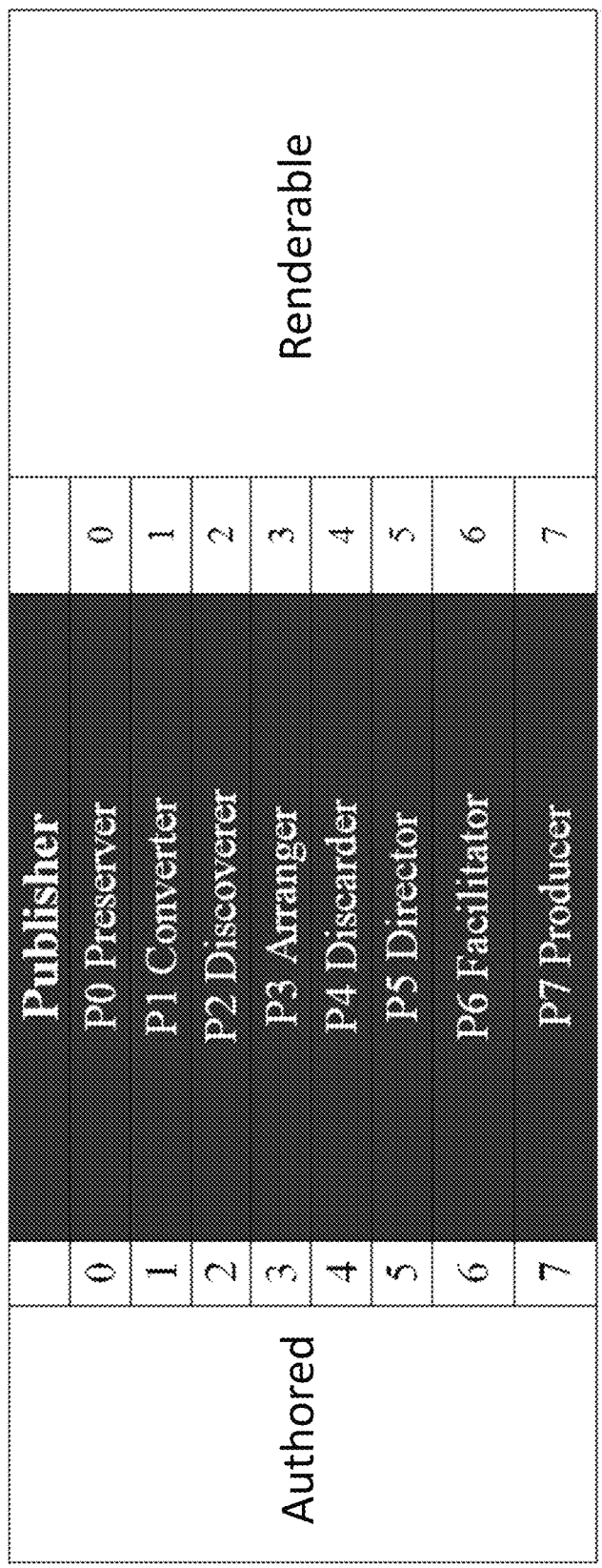
FIG. 5 is a table showing an example of the publishing index levels in accordance with the present invention. Eight publishing index levels are shown in FIG. 5.

The publishing index levels (See FIG. 5 and Table 2, below) are based on the assembly of authored materials into a published structure for subsequent rendering. The publisher is an automated process that consistently reproduces the same repeatable results. Depending upon the ability of the target rendering system, the result of the published structure may require re-ordering authored material, conversion, indexing etc.

Render(able) Index (R Levels—"-ables")

The rendering index levels (See FIG. 6 and Table 3, below) are based on the technological sophistication of the end usage rendering mechanism. The rendering index levels are based on the technological sophistication of the end usage rendering mechanism.

TABLE 1

AUTHORING INDEX LEVELS

| LEVEL | DESCRIPTION |
|---|---|
| A0 - Commenced | Author's thoughts constructed as short statements or figures without details or labels. |
| A1 - Explained | Author's thoughts convened in at least a paragraph with two or more sentences, or as a diagram. Example: An unlabeled diagram or paragraph. |
| A2 - Labeled | Authored object or material marked with the subject of the paragraph or object. Example: The object has a title. A callout on an illustration, diagram or drawing. |
| A3 - Linked | Expansion of the authored material to other related topics and references through labeled objects. |
| A4 - Allocated | Authored materials aligned to a pertinent topic or object. Example: Assignment of applicability identification to portions of the material for later filtering. |
| A5 - Piped | Author directed material with discrete binary choices to direct the user's outcome. Example: Assignment of yes/no decision tree choices. |
| A6 - Coded | Authored logical equations (constructs) designed for cognition by a computer to enable dynamic user interaction. Example: Assignment of actions based upon a logic equation. Is the xyz setting of the 'A' control plus the '13' control together less than a specific number? (Note: Where the final renderer will obtain the values for the 'A' & '13' controls and perform a calculation and a comparison). |
| A7 - Choreographed | Authored materials for non-centralized simultaneous multitasking actions of user(s) and/or equipment(s). Example: A script for a play or movie complete with actors, musical, and video accompaniment. A large distributed script for a show such as on New Year's Eve in multiple cities. |

TABLE 2

PUBLISHING INDEX LEVELS

| LEVEL | DESCRIPTION |
|---|---|
| P0 - Preserver | Moves the idea into a permanent form. Pen to paper, brush to cave wall, chisel to stone, typewriter key to paper |
| P1 - Converter | Migrates the received media into a new form. Cut and paste, scanning paper to raster PDF, migrating raster graphics into vector form, etc. |
| P2 - Discoverer | Detects features and facets. Identification of individual characters and characteristics (e.g., Optical Character Recognition, Shape Feature Recognition, etc.), Converting lines to vectors, Indexing |
| P3 - Arranger | Detected and labelled features are arranged following specific rules/arrangement guidance. Structured, formatted data identified and arranged based on document structure |
| P4 - Refiner | Filtering data based on applicability |
| P5 - Director | Structured data in pre-defined paths for a specific outcome |
| P6 - Facilitator | Coded data composed and stored for intuitive, freeform retrieval based on collaborative transactions between different users, machines, and applications |
| P7 - Producer | Direct multiple renders whether by pre-arranged sequence or by real-time dynamic bundles (of lower P levels) for transmission to render(ers). |

TABLE 3

RENDERING INDEX LEVELS

| LEVEL | DESCRIPTION |
|---|---|
| R0 - Immovable | An object deemed for rendering as permanently as possible. Example: Carved, Etched, Cast, Permanently Mounted: Wall, Board, Tablet, Plaque |
| R1 - Scrollable | An object from a publisher that is larger than the normal capability of the rendering device. Example: More characters or pixels than can be displayed on the rendered media. |
| R2 - Searchable | An object from a publisher that can be searched for particular whole or partial facets. Example: Meaningful, intelligent characters that promote search capabilities |

TABLE 3-continued

RENDERING INDEX LEVELS

| LEVEL | DESCRIPTION |
| --- | --- |
| R3 - Selectable | An object from a publisher that has distinctions that can be referred and linked too. Identified structured objects prepared for navigation between and within objects |
| R4 - Configurable | An object from a publisher that has material divided into Applicabilities. Example: Allows the render to filter displayed information based on user input. |
| R5 - Controllable | An object from a publisher that has a specific binary logic tree that needs to be honored by the rendering system to control the output based on user's answers. |
| R6 - Collaboration | An object from a publisher with a specific set of variables and a specific set of rules for manipulation of the variables, that is used in conjunction with the user render the results. Example: Logically, categorized objects stored as a specific set of variables with a set of rules for their manipulation in conjunction with the user's using a logic engine |
| R7 - Performable | An object from a publisher that has been designed for multiple simultaneous rendering whether co-located or distributed. Example: Processing and rendering is distributed among multiple locations. |

Figure 1:
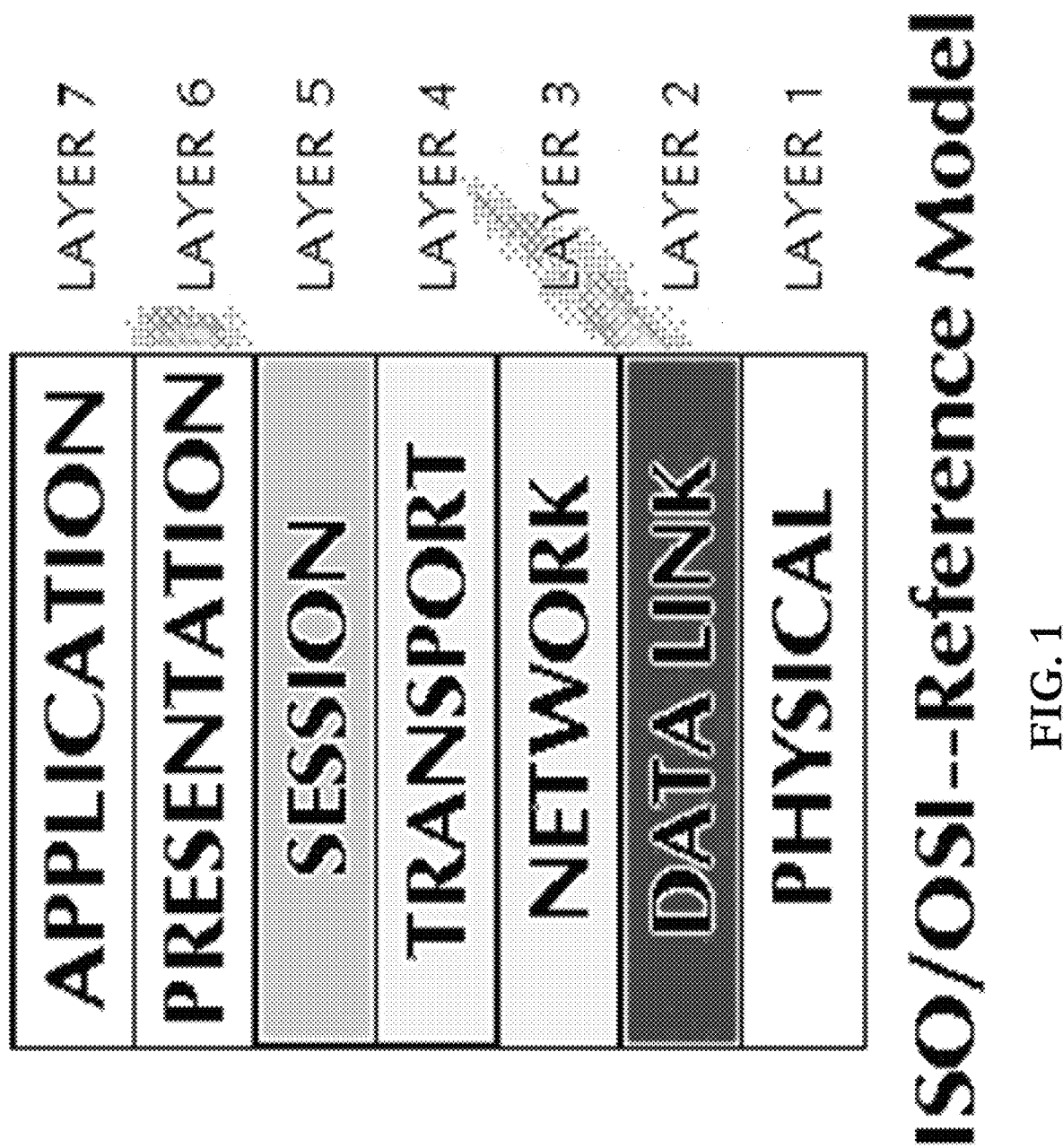
FIG. 1 is a diagram illustrating the Open Systems Interconnection (OSI) Model.

The ISO Model for Open Systems Interconnection is shown in FIG. 1. An example of the present invention's Technical Data Flexibility Index is shown in a similar type of diagram in FIG. 7. Similarly as FIG. 1 depicts the conventional ISO Model, the FIG. 7 depiction of the present invention's Technical Data Flexibility Index is characterized by stages and index levels.

Figure 8:
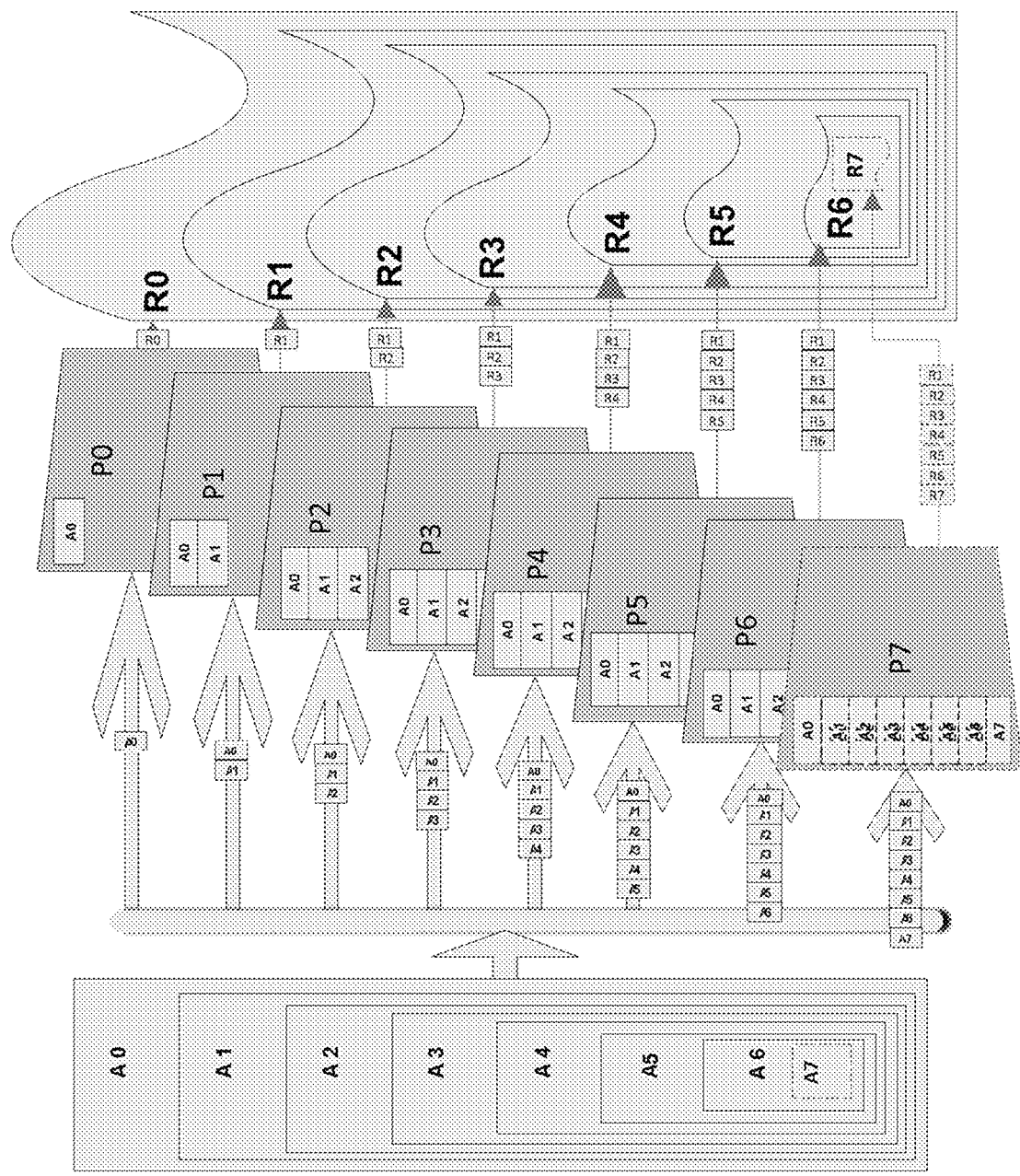
FIG. 8 illustrates an example of diagrammatic flows of Authoring (A0-A7) through Publishing (P0-P7) into Rendering (R0-R7) in accordance with the present invention.

FIG. 8 shows the flow of authored materials into various publishing levels out to a renderer, in accordance with the present invention. Note that a renderer cannot render above its rated level; however, a renderer can render material designed for rendering by the levels below its rating. A0 materials will not be rendered in a permanent form unless the renderer is a level zero, R0 renderer.

In current practice a "functionality matrix" is often used to catalog the possible and desired features in an electronic publishing system, with emphasis on the usability of the published result. Conventional practice previous to the functionality matrix method was to use a set of IETM Classes to define the spectrum of electronic technical manuals. A notable approach in the functionality matrix method is to divide electronic technical manuals into two classifications of Linear and Interactive (Non-Linear), such as shown in FIG. 9, again based primarily on rendering and the rendering mechanism.

The present invention's TD Flex, as exemplarily embodied, is a mechanism that is implemented prior to employment of a functionality matrix. The inventive TD Flex differs from previous methods in significant respects, including the inventive use of quantifiable communication technology maturity milestones as metrics. FIG. 10 inventively revises the linear and interactive Venn diagram shown in FIG. 9 to demonstrate the unique capability of the present invention to portray the differences, and to quantify the three stages (authoring, publishing, and rendering).

Figure 9:
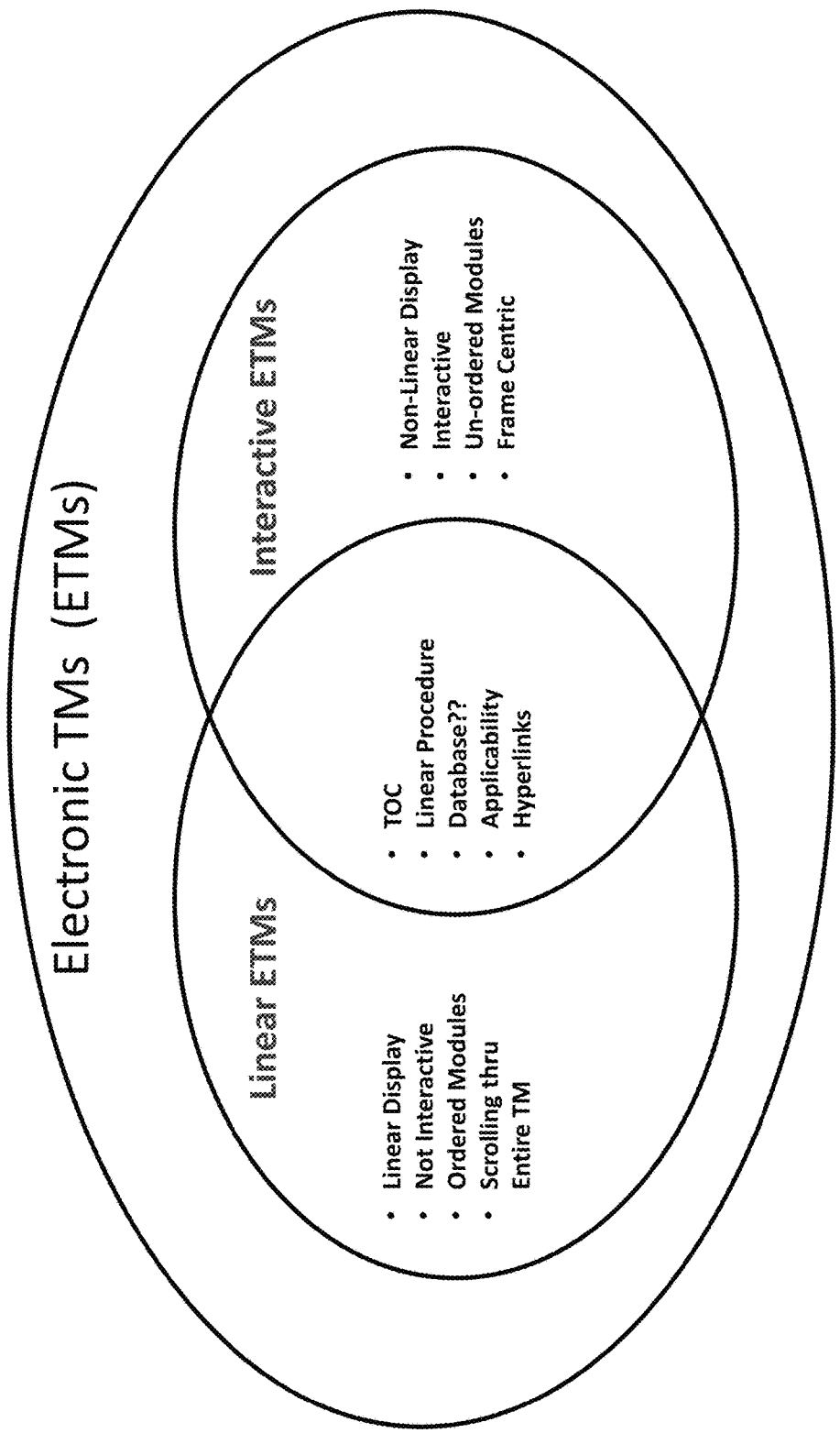
FIG. 9 is an example of an Electronic Technical Manuals (ETM) linear and interactive (non-linear) Venn diagram.
Figure 10:
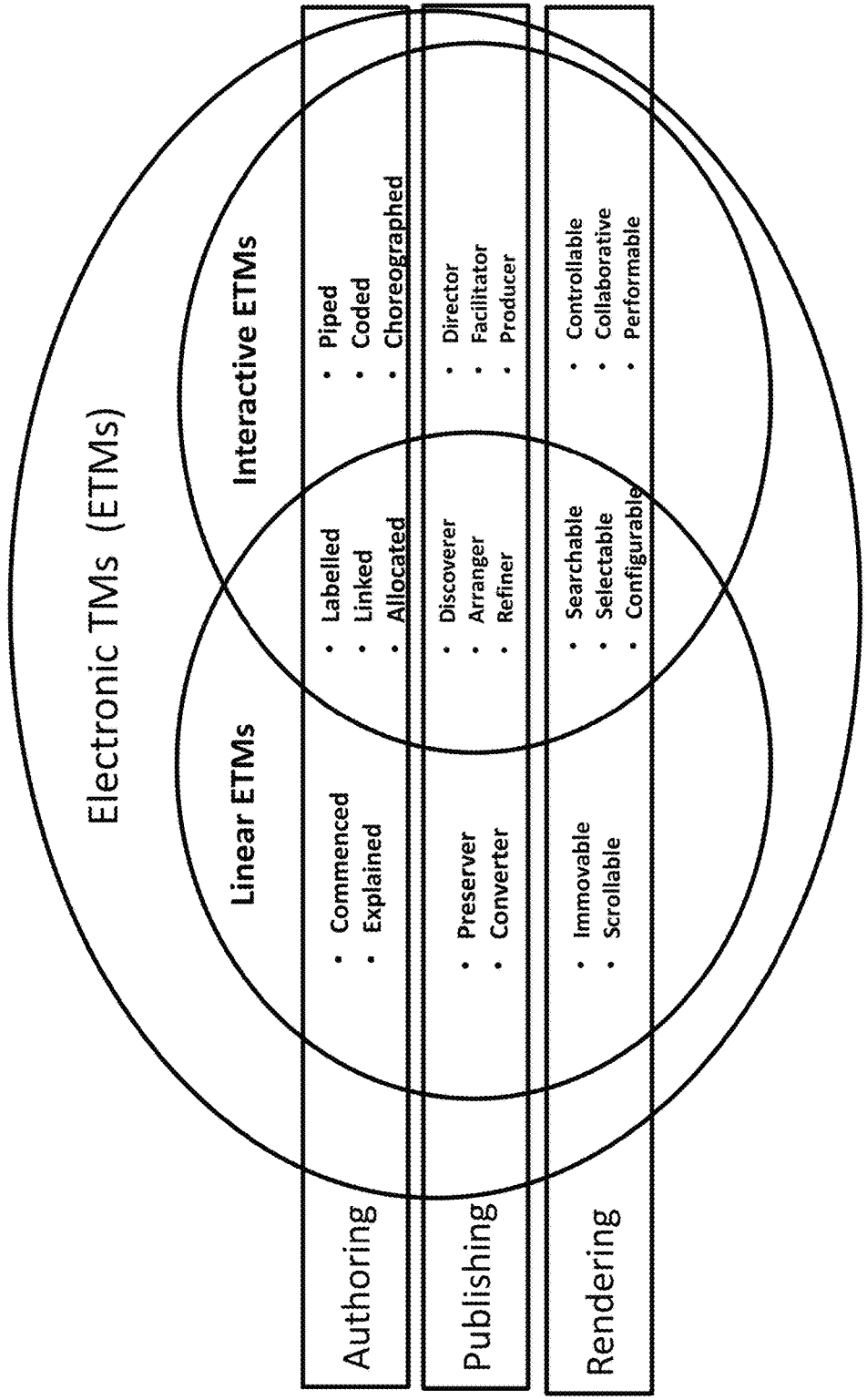
FIG. 10 is a diagram illustrating an example of enhancement by the present invention's TD Flexibility of the ETM linear and interactive (non-linear) Venn diagram shown in FIG. 9.
Figure 11:
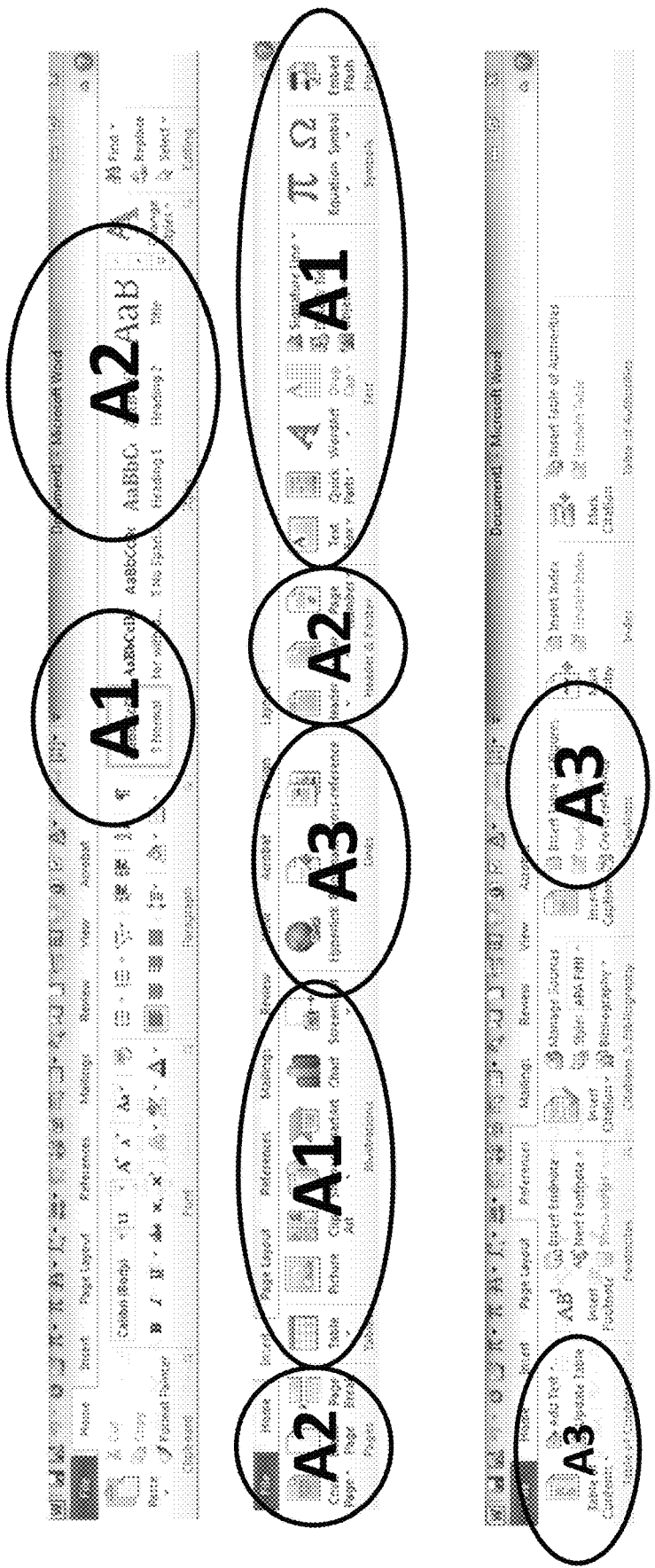
FIG. 11 is an example of authoring software in accordance with the present invention.
Figure 12:
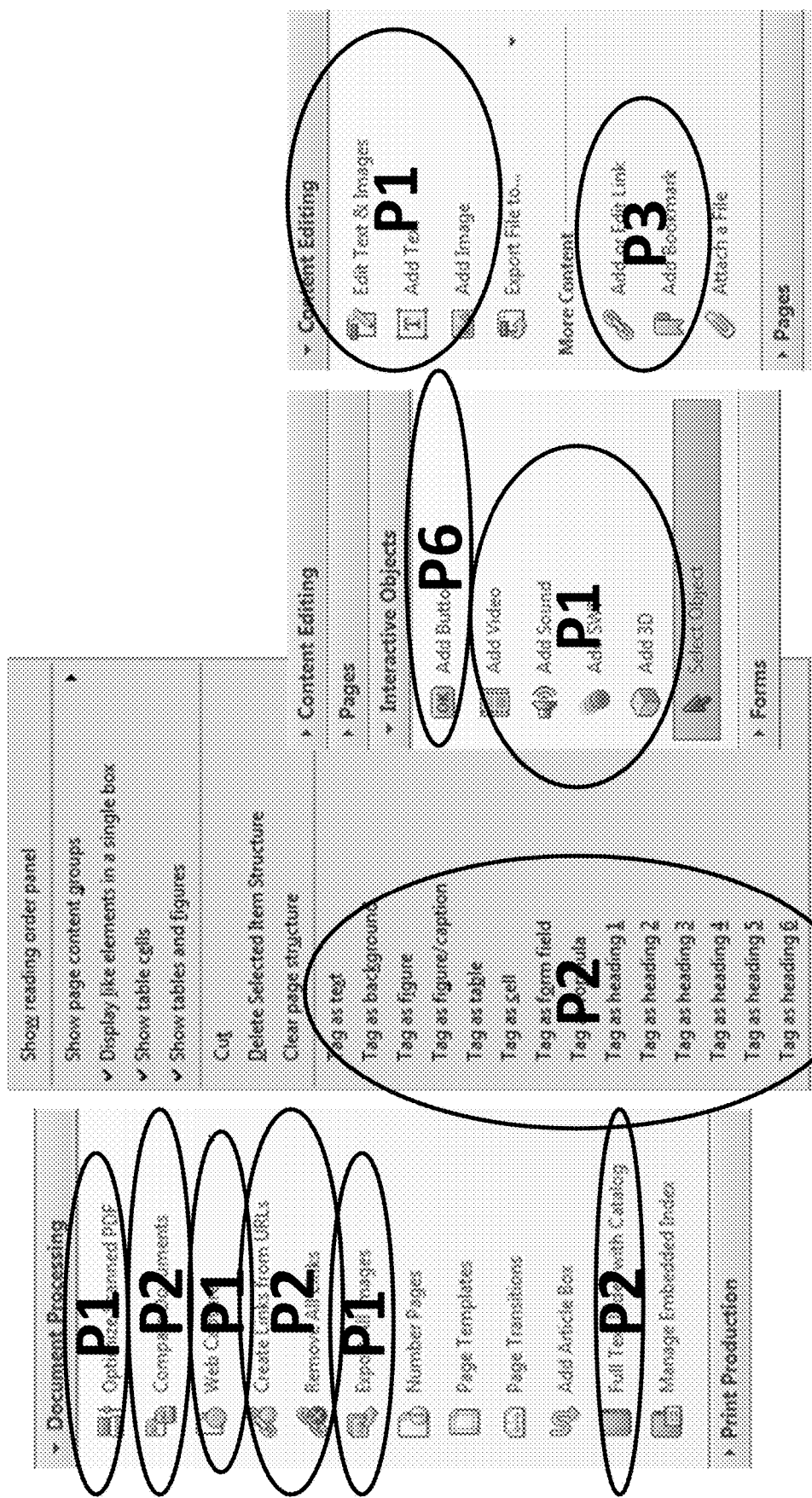
FIGS. 12 and 13 are examples of publishing software in accordance with the present invention.
Figure 13:
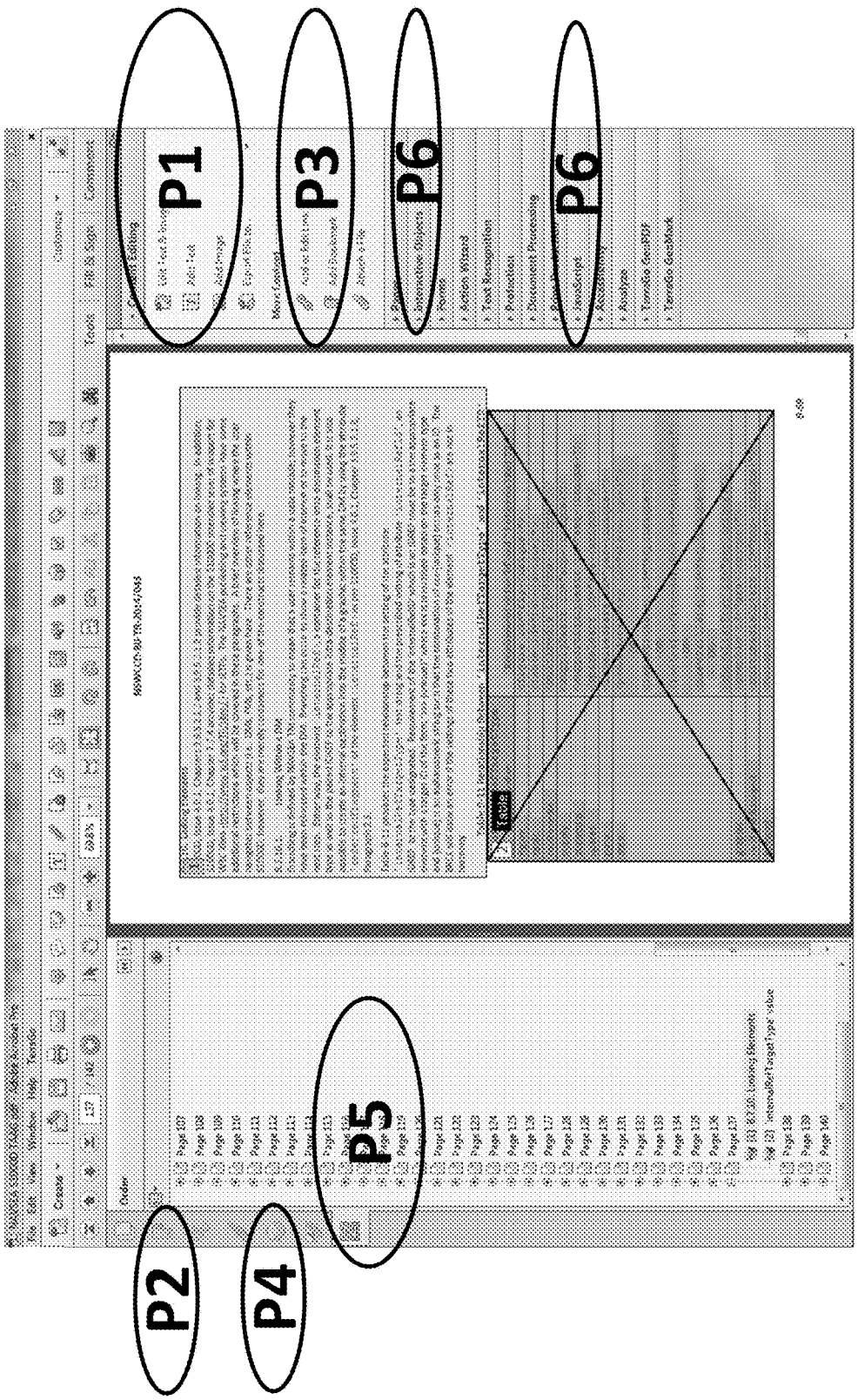
Figure 14:
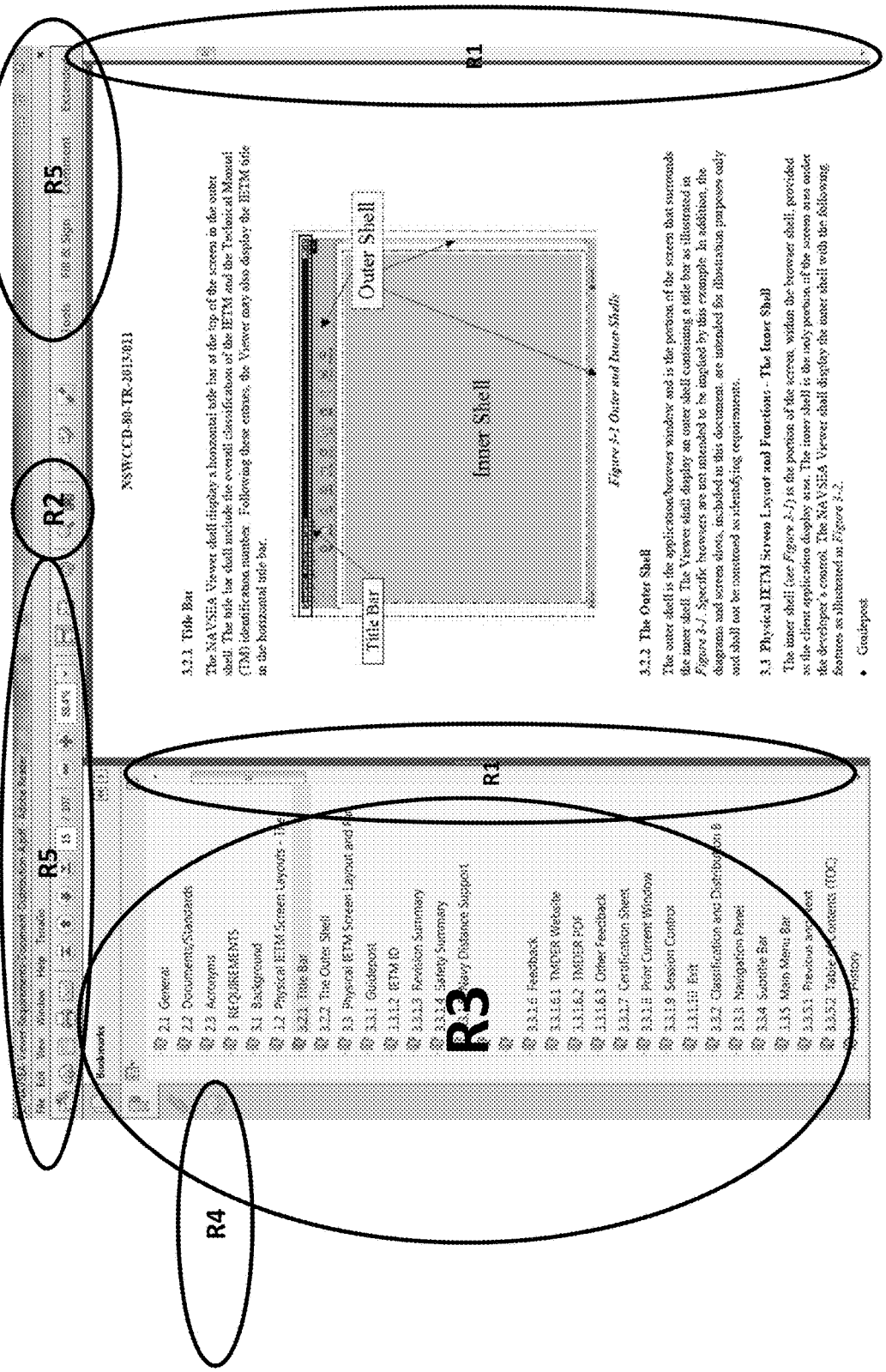
FIGS. 14 and 15 are examples of rendering software in accordance with the present invention.
Figure 15:
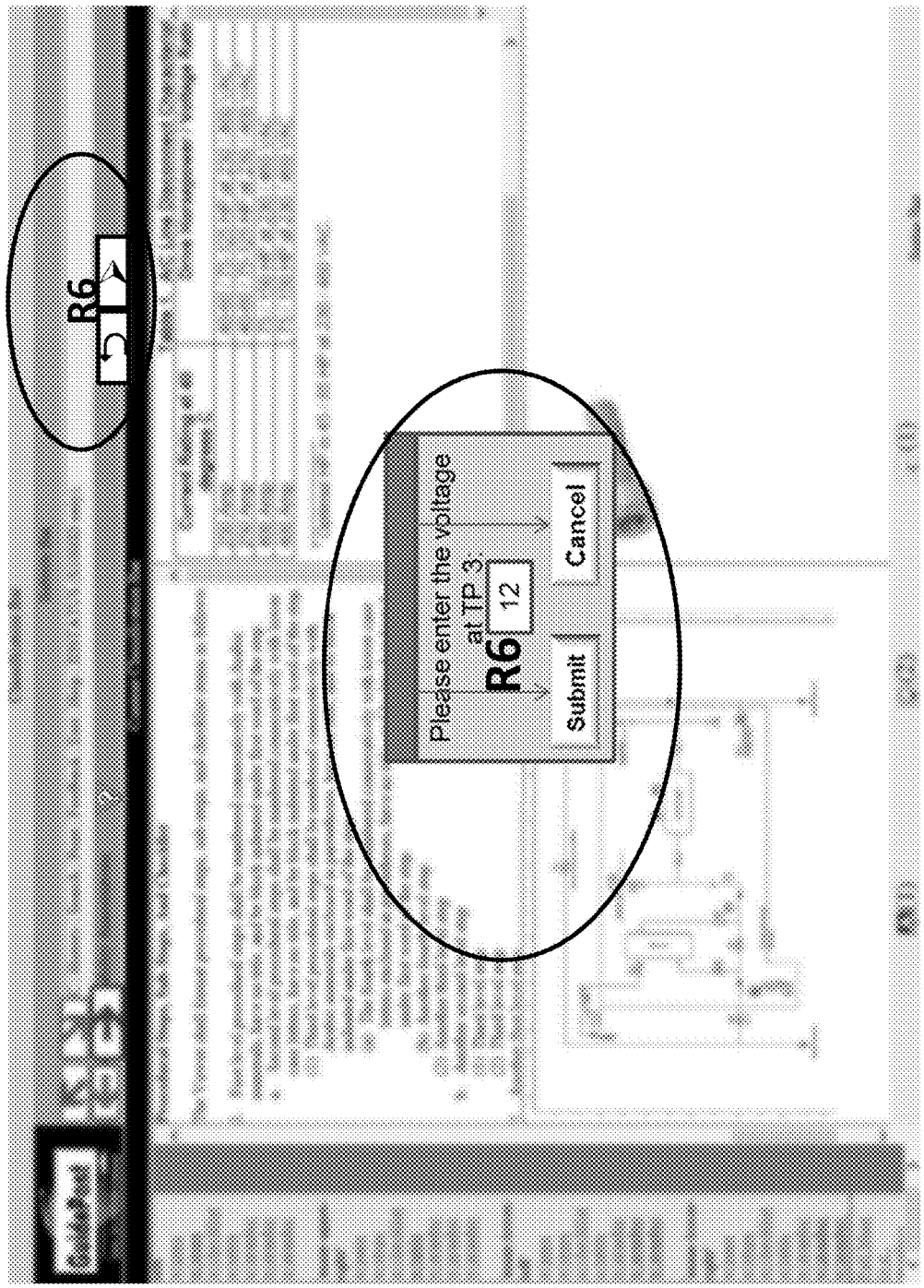

The Venn diagram of FIG. 9 represents a traditional view of the technical field. The Venn diagram of FIG. 10 illustrates how the inventive TD Flexibility Index methodology enhances the traditional ETM Linear and Interactive (Non-Linear) methodology. FIG. 10 aligns the traditional view shown in FIG. 9 with the features and elements of the present invention to demonstrate the unique capability of the present invention to provide differentiations between technical documents that have been traditionally characterized as linear and interactive (non-linear).

In practicing the present invention, existing systems can be quantified and assessed as to the percentage for each index of the stages. With reference to FIG. 3, realizing that authored materials may be at, above, or below the other two indices can provide insight into whether the adoption of a particular renderer or publisher can increase (or decrease) the features anticipated by change.

Similar to electric circuits described in terms of impedance (e.g., resistance, reactance) and admittance (e.g., conductance, susceptance), the determinations of the amount of match in coupling between the Authoring and Publishing stages and the match in coupling between the Publishing and Rendering stages provide a means for analysis to determine the utilization of the tools to provide each of the three stages (renderer, publisher and authoring).

The present invention's TD Flexibility Index, when set up as discrete integers, can have nuances that result in a real (fractional) number for the index. Note that this is also true with the ISO Open Systems Interconnection (OSI) model in its actual use to define the original DOD ARPAnet structure.

The inventive TD Flexibility Index can be multifariously practiced in an expandable way. According to seven-level inventive practice, the index levels commence at level 0 and go up to level 6. According to eight-level inventive practice, the index levels commence at level 0 and go up to level 7. Accordingly, seven-level inventive practice includes levels zero through six; eight-level inventive practice includes levels zero through seven. The present inventors have incorporated the next ability (level 7) into their invention in consideration of the computing cloud, and in consideration of the capacity of each stage to have its own independent yet parallel mode to produce the results of that stage. According to inventive principle, as technology for each of the stages matures, the index is expandable for new levels to handle the next evolution for the stage(s).

An aim of the inventive TD Flexibility Index is to standardize the three characteristic stages for technical documentation of (i) authoring, (ii) publishing, and (iii) rendering. The inventive TD Flexibility Index can be applied to any mechanism or process that generates information, prepares the information for delivery, and then renders or displays the delivered information, whether non-fiction or fiction.

Examples of the kinds of information that are suitable for inventive practice include but are not limited to the following: novels; stock indices; quarterly reports; annual reports;

legislative documentation; administrative instructions/orders/specifications; planning; manufacturing. The methodology of the present invention can be applied to any information that is conveyed for human senses (visual, auditory, olfactory, sensory/tactile, taste) or for cognitive machinery.

Figure 16:
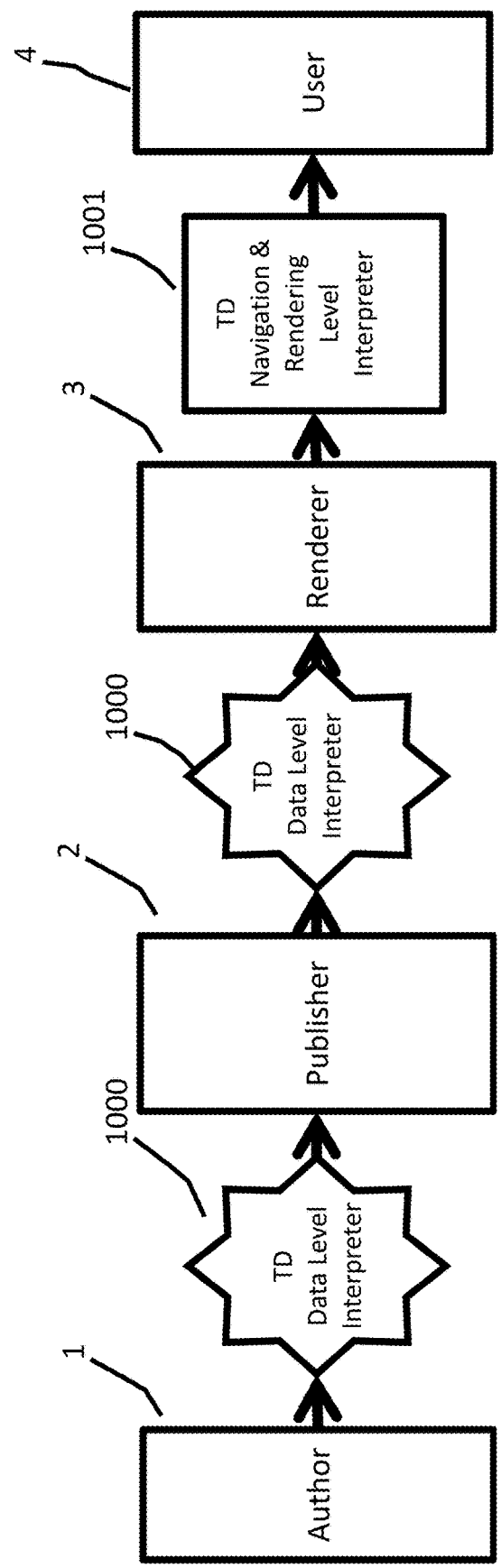
FIGS. 16 through 18 are diagrams illustrating examples of components to interpret the levels of technical data and controls being generated and consumed to determine the Technical Data Level for the present invention's Technical Data Flexibility Index.

In order to use the present invention as exemplarily embodied, it is necessary to identify the level of the technical data being generated and consumed. Referring to FIG. 16, the Technical Data Level Interpreter [1000] is used between the Author [1] and the Publisher [2] to obtain the output level of the Author and likewise between the Publisher [2] and the Renderer [3] to obtain the output level of the Publisher. The Technical Data Navigation & Rendering Level Interpreter [1001] is used between the Renderer [3] and the User [4] to obtain the output level of the Renderer. The User [4] is the end user of the Renderer [3] produced embodiment of the communication (e.g., screen display, printout, etched stone, etc.)

Figure 17:
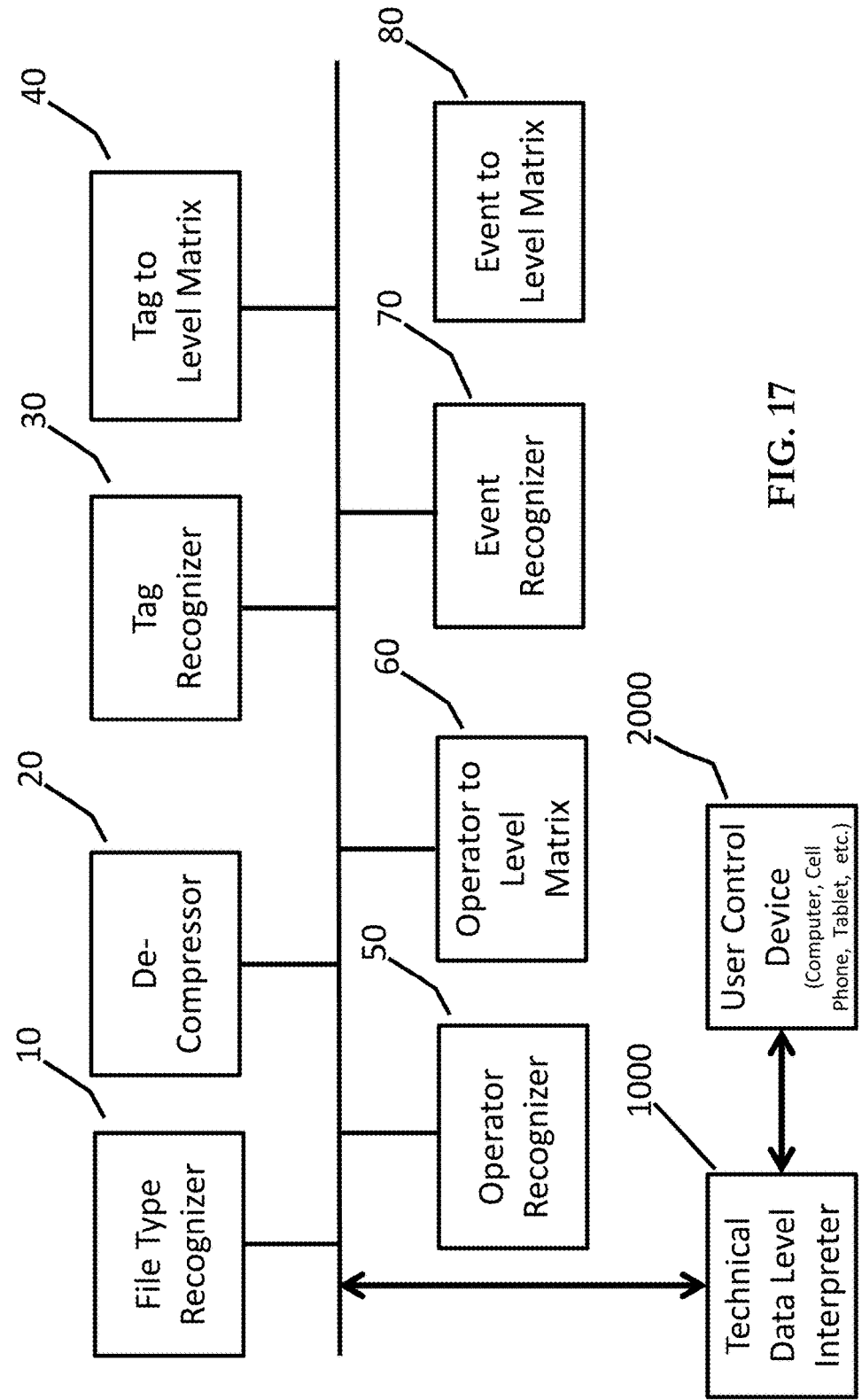

Referring to FIG. 17, the present invention includes recognition [10, 30, 50, 70, 90], de-compression [20] and matrix [40, 60, 80] components combined with a controlling device [2000] (e.g., a computer, cell phone, or tablet), which interacts with the other components and provides a measure of the Technical Data Flexibility Level. The drawings herein are for purposes of illustrating examples and preferred embodiments of the present invention and are not intended to be limitative of the present invention. FIG. 17 is a block diagram illustrating the basic model for recognizing the Technical Data Flexibility Level of a given output of either the authored or published components.

The file type recognizer [10] will utilize the provided extension of the file (e.g., .txt, .htm, .html, .png, .jpeg, .jpg, .mov, .avi, .pdf, .xml, etc.) to categorize the file. The de-compressor [20] is utilized to decompress files that have been compressed (e.g., .zip, .docx, .pptx, .xlsx, .svgx). The tag recognizer [30] recognizes tag pairs (e.g. "<" tag ">", begin tag end, open tag close, etc.) commonly used in extensible Markup Language (XML) (w3.org), HyperText Markup Language (HTML) (w3.org), Standard Generalized Markup Language (SGML) (ISO 8879), Scalable Vector Graphics (SVG), etc. When decompressed, many formats become XML. The tag to level matrix [40] contains a set of possible tags and their associated Technical Data Flexibility level. The operator recognizer [50] recognizes operands and operators of the form func "(" variables ")" where "func" represents the assigned name of the operator and often the operation is further expanded in the form "{" parameters, statements and/or function calls "}" which are used within many programming languages (e.g., Postscript, Basic, Adobe PDF, C, C++, C #, Java, Cascading Style Sheets, Microsoft® Batch Files, etc.). The "operation to level matrix" [60] contains a set of possible operators/operands and their associated Technical Data Flexibility level. The "event recognizer" [70] is used in conjunction with the "tag recognizer" [30] or "operator recognizer" [50] to find calls to external data modifiers (e.g., dialog inputs from users, sensor data, keystrokes, button presses, hardware interrupt handling, etc.). The "event to level matrix" [80] contains a set of possible events and their associated Technical Data Flexibility level. The "technical data level Interpreter" [1000] receives the inputs from the other blocks and directs data to other blocks in the diagram to achieve the resulting Technical Data Flexibility level. Functions are combinations of operators and events working with variables; thus, recognition of operators and events is sufficient to categorize the Technical Data Flexibility level.

Figure 18:
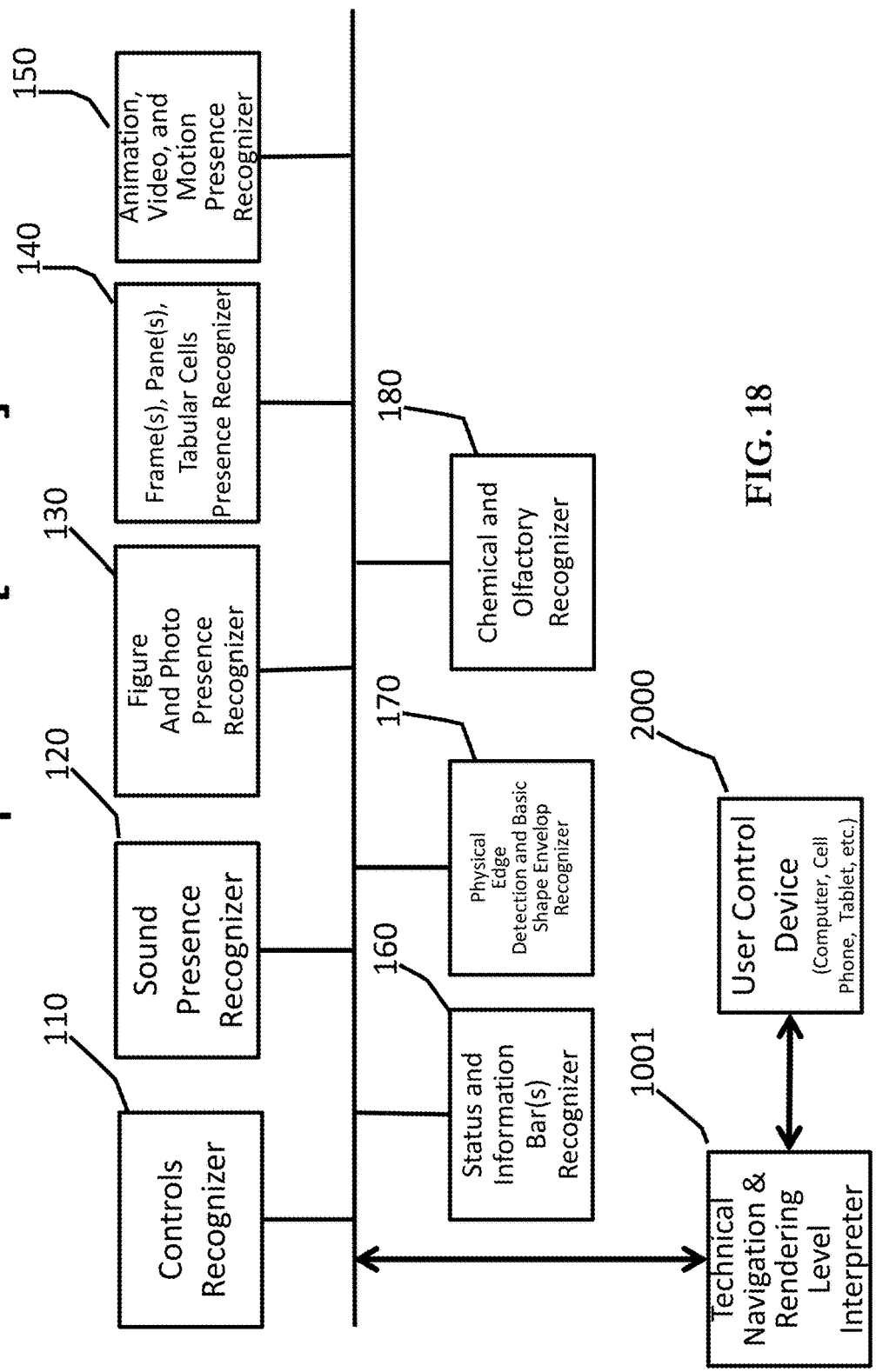

Referring to FIG. 18, the block diagram illustrates the basic model for recognizing the Technical Data Navigation and Rendering Level of a given output of the rendered components. The Technical Data Navigation & Rendering Level Interpreter [1001] includes: a "Controls Recognizer" [110], which identifies navigation controls; a "Sound Recognizer" [120], which recognizes the presence of audio; a "Figure & Photo Presence Recognizer" [130]; a "Frames, Panels & Tablular Cells Presence Recognizer" [140], which recognizes the divisions of the rendering; an "Animation, Video & Motion Presence Recognizer" [150], which recognizes the presence of movement within the rendering; a "Physical Edge Detection and Basic Shape Envelope Recognizer" [170], which recognizes when the rendering is a physical rendering (e.g., when not on a screen); and a "Chemical and Olfactory Recognizer" [180], which recognizes when the rendering is a chemical or liquid. The "Technical Data Navigation & Rendering Level Interpreter" [1001] is paired with the "Controlling Device" [2000] to collect the Technical Data Level of the Rendering.

Figure 19:
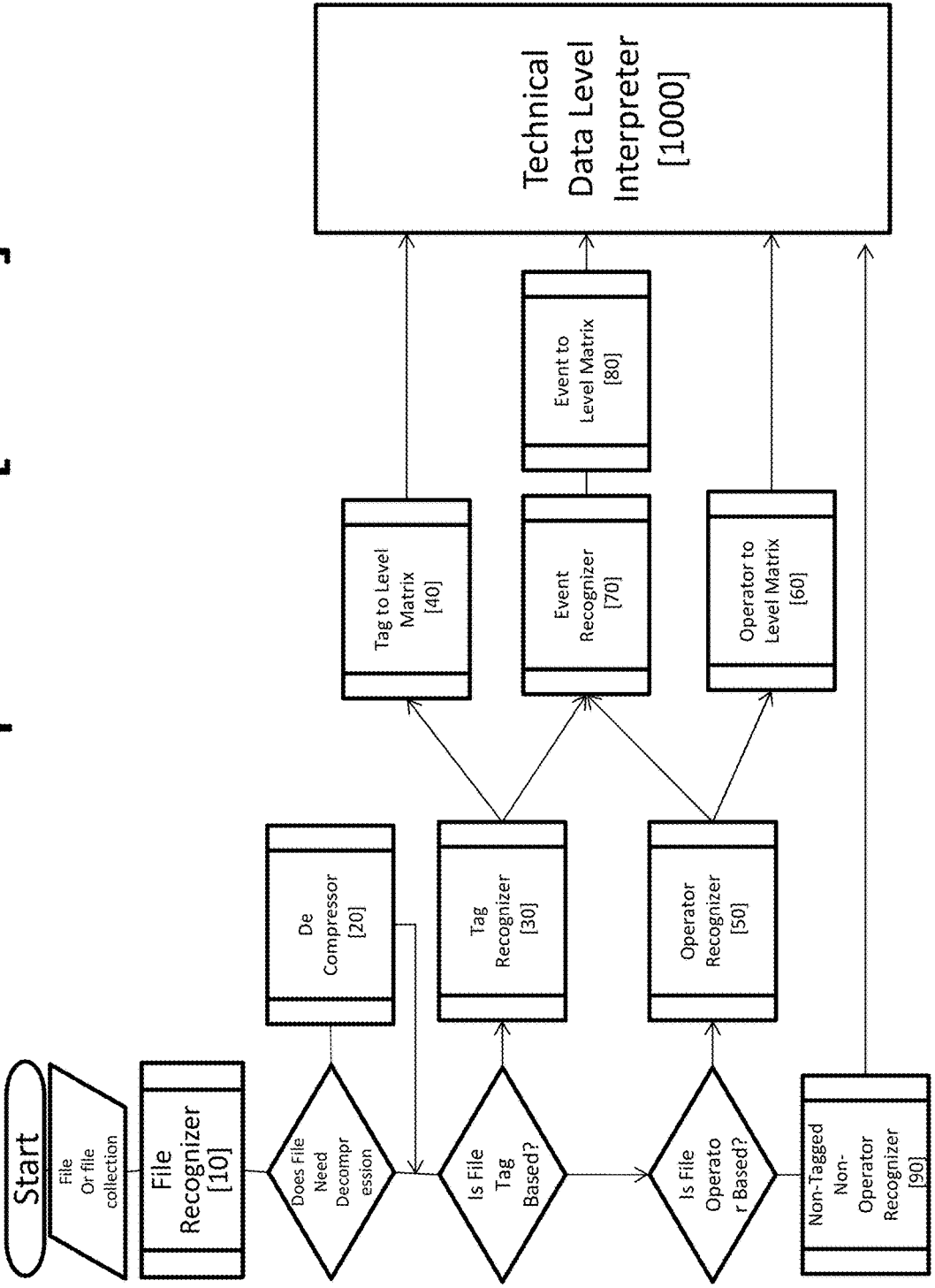
FIGS. 19 and 20 are diagrams illustrating an example of a flow diagram for determination of the Technical Data Level for the present invention's Technical Data Flexibility Index.

FIG. 19 is a flow diagram depicting one inventive implementation of the steps taken to process the output of the Author [1] or the Publisher [2] or other generated intermediary result prior to the actual rendering embodied as an electrical, chemical, or physical rendering. The first step is the selection of the input data set from the plethora of files to be analyzed. The file recognizer [10] utilizes the provided extension of each of the files (e.g., .txt, .htm, .html, .png, .jpeg, .jpg, .mov, .avi, .pdf, .xml, etc) to categorize each file. When the categorization of a file indicates decompression is needed, each file needing decompression is processed by the decompressor [20]. When categorization of a file indicates it consists of tag pairs or when decompressed the categorization of a decompressed file consists of tag pairs, the contents of the file are processed by the tag recognizer [30] to collect the list of tags in use by the file. The list of tags is supplied to the tag to level matrix [40] which will supply a numeric level corresponding to the Technical Data Flex level of the tag pair to the technical data level interpreter [1000]. The technical data level interpreter calculates and then evaluates the quantity of tags at each of the eight TD Flex levels for each file and collects the overall Technical Data Flex level for the input data set under analysis.

When a file is categorized by the file recognizer [10] as containing operators usually in the form func "(" variables ")" where "func" represents the assigned name of the operator (e.g. set(true), if(condition, value a, value b), etc.) and often the operation is further expanded in the form "{" parameters, statements and/or function calls "}", the contents of the file are processed by the operator recognizer [50] to collect the list of operators in use by the file. The list of operators is supplied to the "operation to level matrix" [60] which supplies a numeric level to Technical Data Flexibility level of the operator to the technical data level interpreter [1000]. The technical data level interpreter calculates and then evaluates the quantity of operators at each of the eight TD Flex levels for each file and collects the overall Technical Data Flex level for the input data set under analysis.

When a file is categorized by the file recognizer [10] as containing something other than tag pairs or operators, the "Non-Tagged Non-Operator Recognizer" [90] provides the processing for the unexpected case. The processing for the unexpected case may result in a corrected determination of the characterization of the file via further analysis and via consulting with other resources (e.g., cloud or internet based services, etc.) and re-entering the analysis from the beginning prior to the file recognizer [10] with the resolved file categorization. Another embodiment of the "Non-Tagged Non-Operator Recognizer" [90] may simply provide a diagnostic result to the Technical Data Level Interpreter.

When a tag pair or operator is sensed by the tag recognizer [30] or the operator recognizer [50], the result is provided to the "event recognizer" [70] to recognize the presence of external data modifiers (e.g., interrupts, radio buttons, checkboxes, dialogs, selectable items from menus, selectable items from selection wheels, selectable items from prompts, inputs, sensors, button presses, keystrokes, etc.) often referred to as 'interrupts' or 'events' in computing terminology. The "event to level matrix" [80] supplies a numeric level to Technical Data Flexibility level of the event to the technical data level interpreter The technical data level interpreter calculates and then evaluates the quantity of events at each of the eight TD Flex levels for each file and collects the overall Technical Data Flex level for the input data set under analysis.

The Technical Data Level Interpreter [1000] collects the quantity of tags, events and operators at each of the eight TD Flex levels for each file and collects the overall Technical Data Flex level for the plethora of input files under analysis. The Technical Data Level Interpreter [1000] provides results to a User Control Device [2000] when used to analyze the output of an Author [1], a Publisher [2], or other generated intermediary result prior to the input to the actual rendering.

Figure 20:
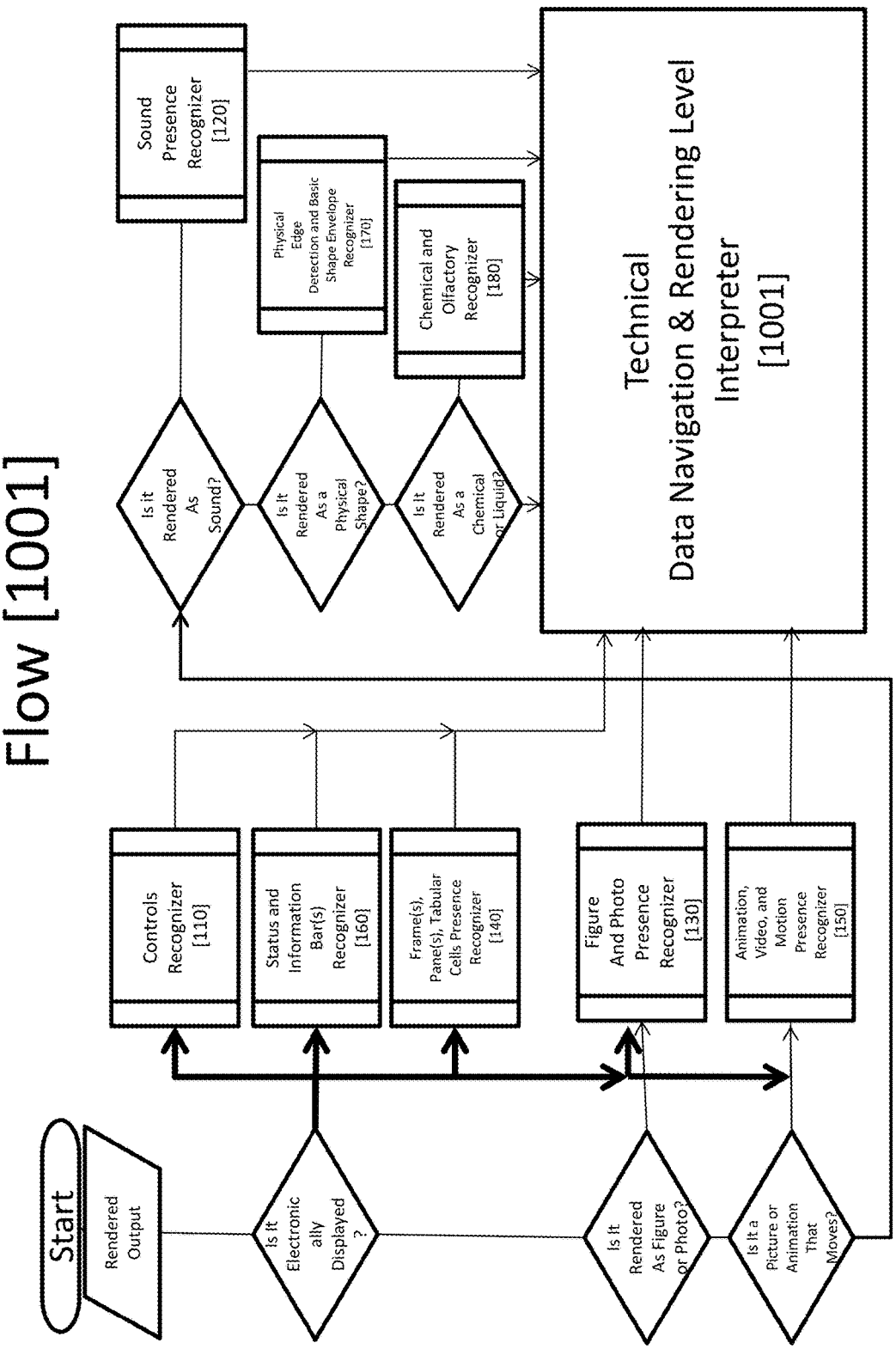

FIG. 20 is a flow diagram depicting one inventive implementation of the steps taken to process the output of a Renderer [3]. The Technical Data Navigation & Rendering Level Interpreter [1001] provides the TD Flex level for an actual rendering embodied as an electrical, acoustic, chemical, or physical rendering. Various embodiments of the Technical Data Navigation & Rendering Level Interpreter are possible, such as those involving a simple checklist, or those involving utilization of U.S. Pat. No. 7,092,552 B2 to Harrington et al. entitled "System and Method for Measuring and Quantizing Document Quality," hereby incorporated herein by reference, or those involving another means. A rendered output is used to determine the TD Flex level depending upon the embodiment of the rendering. Factors may be relevant such as whether the rendering is on an electronic screen [110,160,140,130,150]; or whether the rendering is via a pictorial means (e.g., figure, photo, printout, etc.) [130]; or whether the rendering contains a moving component (e.g., film, animation, video, propeller, etc.) [150]; or whether the rendering contains an audible component (e.g., music, alarm, intentionally uttered, etc.) [120]; or whether the rendering contains a physical rendering (e.g., touchable) [170] or chemical rendering (e.g., powder, liquid, gas, taste-able, olfactory, etc.) [180]

Still with reference to FIG. 20, the "Controls Recognizer" [110] recognizes navigation controls (e.g., buttons, tabs, keys, vocally controlled, eye blink detector, etc.). The "Sound Recognizer" [120] recognizes the presence of audio output (e.g., song, music, alarm, utterance, etc.). The "Figure & Photo Presence Recognizer" [130] recognizes items which are graphical or pictorial in nature (e.g., figure, drawing, schematic, flow diagram, photo, or printout). The "Frames, Panels & Tabular Cells Presence Recognizer" [140] recognizes the presence of divisions and partitions of the rendering to include frames or panes, table-containing entries, etc. The "Animation, Video & Motion Presence Recognizer" [150] recognizes the presence of movement within the rendering. The "Physical Edge Detection and Basic Shape Envelope Recognizer" [170] recognizes when the rendering is a physical rendering (e.g., when not on a screen). An example is when the rendering is the output of additive manufacturing (e.g., a 3D Printer). The "Chemical and Olfactory Recognizer" [180] recognizes when the rendering is a chemical powder, gas, or liquid. An example is when the output involves mixing powders, gases, or liquids resulting in either a chemical reaction or a combined substance. The "Technical Data Navigation & Rendering Level Interpreter" [1001] is paired with the User Control Device [2000] to collect the Technical Data Level of the Rendering.

Described hereinbelow are exemplary embodiments of the following elements of the present invention: Author [1]; Publisher [2]; Renderer [3]; User [4]; File Recognizer [10]; Decompressor [20]; Tag Recognizer [30]; Tag to Level Matrix [40]; Operator Recognizer [50]; Operator to Level Matrix [60]; Event Recognizer [70]; Event to Level Matrix [80]; Non-Tagged; Non-Operator Recognizer [90]; Controls Recognizer [110]; Sound Presence Recognizer [120]; Figure and Photo Presence Recognizer [130]; Frame(s); Pane(s); Tabular Cells Recognizer [140]; Animation; Video; and Motion Presence Recognizer [150]; Status and Information Bar(s) Recognizer [160]; Physical Edge Detection and Basic Shape Envelope Recognizer [170]; Chemical and Olfactory Recognizer [180]; Technical Data Level Interpreter [1000]; Technical Navigation & Rendering Level Interpreter [1001]; User Control Device [2000].

Author [1]

The technical content material can be authored in one continuous piece or as a set of pieces wrought simultaneously by multiple authors. Simultaneous authoring requires authors to use a prearranged, standardized, naming convention.

In accordance with exemplary inventive practice, an author (e.g., a technical writer, song writer, computer programmer, playwright, composer, journalist, etc.) will use a medium such as paper or authoring software to generate their source document. Software may be Word Processing Native Format (e.g., Microsoft Word .doc, .docx, etc.), Presentation Slide Native Format software (e.g., Microsoft PowerPoint .ppt, .pptx, etc.); Computer Aided Design (CAD) software; Computer Aided Manufacturing (CAM) software; computer-aided engineering (CAE) system; etc. Handwritten and typed embodiments onto a medium such as paper, velum, or other physical means may also be used.

The present invention's embodiment of the author is situational, depending upon the state/maturity/content/TD Flex Index Level of the information to be authored. While a preferred embodiment of the author is the output of a computer processor as an electronic file intended as an electronic document, it may be equally valid that another means such as a human generating a recipe, a musical score, a theatrical script, chorography, numerically controlled machinery script, or other set of directions be produced to be passed to a publisher. An alternative embodiment may be a traditional manuscript generated by hand-written or hand-drawn means.

Publisher [2]

In accordance with exemplary inventive practice, a Publisher is an assembly of authored materials into a published structure for subsequent rendering. The publisher is an automated process that consistently reproduces the same repeatable results. Depending upon the ability of the present invention's target rendering system, the result of the published structure may require re-ordering, conversion, indexing, etc. of authored material.

Inventive software provides a set of directions to the renderer. The directions can be in HTML, XML, XSLT, PDF, CNC, STL, Musical Score, Theatrical Score, Chorography, Postscript, HPGL, 3D, DFX, ISO ISMID, ISO/IEC 13240, SVG, CGM, JPG, GIF, PNG, etc. See also ISO Standards Catalogue 35.240.30—IT application in information, documentation and publishing. In terms of Hardware and Physical, a human editor is an alternative publisher as he/she can configure an authored document into a form for rendering. Setting type (e.g., typesetter) represents another publisher means, to configure a drum or plate for the renderer.

The present invention's embodiment of the publisher is situational, depending upon the state/maturity/content/TD Flex Index Level of the information to be published as well as the intended rendering medium and its TD Flex Index Level. While a preferred embodiment involves the output of a computer processor following a publishing algorithm (e.g., script, style sheet) as an electronic file intended as an electronic document, it may be equally valid that another means such as a human generating a recipe, a musical score, a theatrical script, chorography, numerically controlled machinery script, or other set of directions be produced to be passed to a renderer.

Renderer [3]

In accordance with exemplary inventive practice, a rendering is a result of using the instructions provided by the publisher to generate something that can be sensed. For a human to receive a rendering it must be touchable, smell-able, hearable, taste-able, and/or see-able. In other words, the sensory information that is generated may be anything that is perceptible, such as via the human senses of vision, hearing, smell, touch, and/or taste.

A rendering requires the generation of something that can be sensed (e.g., touchable, smell-able, hearable, taste-able, see-able). As such, the rendering will be something physically generated, for instance: an object that is hand-crafted; an Etching; a Carving; a Painting; Inking; Writing; Printing; Additive Manufacturing; 3D Printing; Subtractive Manufacturing; Electronic Display (e.g., Screen, Projector, Monitor, etc.); Augmented Reality; Virtual Reality; Virtual Worlds; Photorealistic Imaging; Point Cloud Visualization; Chemical Reaction; Aromatic Dispensing; Audio; Visual; Networked Renderers (multiple rendering devices not necessary co-located); Electronic Speaker Output, Orchestra Instrument(s), brain stimuli, Volumetric Displays (An online Wikipedia article entitled "Volumetric Display" is informative).

A preferred inventive embodiment for technical documents is one which is intended as an electronically generated display. An alternative inventive embodiment for technical documents is a printout (e.g., paper output). Inventive practice may provide for use of any rendering device capable of generating something that is touchable, smell-able, hearable, taste-able, and/or see-able.

Other technological renderings that may be suitable for inventive practice include: 3D Printing; Additive Manufacturing; Subtractive Manufacturing; Computer Numerical Control (CNC) driven Output; aromatic rendering; generation of a chemical powder or gas or other by-product of a chemical process. Because a typical autonomous control system has sensor capabilities, it too may be a type of technological renderer (e.g., autonomous vehicles or delivery robots) that is suitable for inventive practice. Other examples of technologically suitable renderer outputs may involve, for instance, operation of a sensory implant (e.g., cochlear or visual cortex) into a human cortex, or operation of a prosthetic.

User [4]

In accordance with exemplary inventive practice, a User [4] is the end user of the Renderer [3]—produced embodiment of the communication (screen display, printout, etched stone, etc.). A preferred inventive embodiment of the user is a human user. However, it is possible in inventive practice that secondary machinery or a secondary computational device or another receiver (e.g. robot, android, or artificial intelligence-driven device) be the user.

File Recognizer [10]

In accordance with exemplary inventive practice, the file recognizer [10] utilizes the provided extension of each of the files (e.g., .txt, .htm, .html, .png, .jpeg, .jpg, .mov, .avi, .pdf, or .xml) to categorize each file. Inventive software takes the filename extension and categorizes the files for further interrogation by a downstream decompressor or detailed recognizer.

Compressed files need to be decompressed to determine the file extension of the compressed file(s). The filename extensions of the decompressed files are again run through the file recognizer. The file recognizer [10] uses an array to compare the filename extension against a list of known extensions, and determines the file type and which recognizer will further analyze the file. A preferred inventive embodiment of the file recognizer [10] involves the use of an array to compare the filename extension against a list of known extensions and determines the file type and which recognizer will further analyze the file.

Decompressor [20]

When the categorization of a file indicates that decompression is needed, each file needing decompression is processed by the decompressor [20]. The present invention's decompressor [20] is data decompression software, such as software that is typically referred to in computer software arts as a "file archiver." An online Wikipedia article entitled "Comparison of File Archivers" is informative about file archivers. Examples include, for instance, Winzip, Pkzip, and 7zip for the various compression formats (e.g., .zip, .tar, .gz, .gzip, or .bzip2).

The preferred embodiment of the present invention's decompressor [20] will depend upon the input data set from the plethora of files to be analyzed. A typical embodiment would involve handling of the decompression of the widely used .zip format; however, .tar format and other file decompressors may also be used in inventive practice.

Tag Recognizer [30]

Tag pairs, the contents of the file, are processed by the present invention's tag recognizer [30] to collect the list of tags in use by the file. Inventive software dissects the data instance to determine if the file contains metadata about the data structure. The software flags the data structure for use by the Tag to Level Matrix and Event Recognizer. The software determines the data structure is well-formed and then proceeds to gather the number of unique tags within the data instance.

Preferred inventive embodiments of the software afford (i) the ability of the software to flag the data structure, and (ii) the ability of the software to recognize a tag pair as defined by "<{tag name} {tag attributes}>{content}<\{tag name}>" and "<\{tag name} {tag attributes}>". In accordance with exemplary inventive practice, the results are then passed to other components for further processing.

Tag to Level Matrix [40]

The tag to level matrix [40] supplies a numeric level, corresponding to the Technical Data Flex level of the tag pair, to the technical data level interpreter [1000]. Inventive software takes an input (tag pair) and looks it up in a table, which generates the level of the item being looked up. Note that a particular inventive embodiment may be tuned or trained only for a particular data set. That is, it may not be required that all possibilities for all data sets be arranged.

A preferred inventive embodiment affords the ability of the software to use the flagged data structure placed into an array with levels for each tag pair to determine the level of the tag pair within the data instance. Tag pairs providing basic descriptive content will be a lower level than tag pairs providing structural content such as tables or reference tag pairs to other tag pairs or files or to tag pairs requiring operators or outside processors. Reference (linkage) tag pairs to tag pairs within the same instance will be at a lower level than tag pairs to other (external to current file being analyzed) instances and a higher level would be references to other files such as graphic files. References to other files being used as an operator processor would be at the highest level(s). In accordance with exemplary inventive practice, a count of the numbers of the tag pairs present within the input data set as well as the current file being analyzed would be passed to the next component as well as the level of each tag pair found.

Operator Recognizer [50]

Operators are usually in the form func "(" variables ")", where "func" represents the assigned name of the operator (e.g. set(true), if(condition, value a, value b), etc.). Often the operation is further expanded in the form "{"parameters, statements and/or function calls "}". The contents of the file are processed by the present invention's operator recognizer [50] to collect the list of operators in use by the file.

Inventive software dissects the data instance to determine if the file contains metadata about the data structure. The software flags the data structure for use by the Operator to Level Matrix [60] and the Event Recognizer [70]. The software determines that the data structure includes operators and then proceeds to gather the number of unique operators within the data instance. Preferred inventive embodiments include: (i) the use of an array to compare the filename extension against a list of known extensions which may or will contain operator functions; and (ii) the ability of the software to recognize operator functions.

Operator to Level Matrix [60]

The present invention's "Operation to Level Matrix" [60] supplies a numeric level corresponding to the Technical Data Flexibility level of the operator to the technical data level interpreter [1000]. Inventive software takes an input (operator) and looks it up in a table containing the level of the operator being looked up. Note that a particular inventive embodiment may be tuned or trained only for a particular data set. That is, it is not required that all possibilities for all data sets be arranged.

A preferred inventive embodiment involves use of an array with levels for each operator to determine the level of the operator or operator combination. More difficult operators like processor controls will have the highest level operators, while basic procedural instructions, comparisons, and arithmetic computations will be lower. A count of the numbers of the operators present within the input data set as well as the current file being analyzed would be passed to the next component as well as the level of each operator found.

Event Recognizer [70]

The present invention's "Event Recognizer" [70] recognizes the presence of external data modifiers (e.g., interrupts, radio buttons, checkboxes, dialogs, selectable items from menus, selectable items from selection wheels, selectable items from prompts, inputs, sensors, button presses, keystrokes, often referred to as "interrupts" or "events" in computing terminology. Inventive software takes an input (e.g., tag or operator) and looks it up in a table to identify it as a possible event. Note that a particular inventive embodiment may be tuned or trained only for a particular data set. That is, it is not required that all possibilities for all data sets be arranged. A preferred embodiment of this inventive software includes the ability of the software to recognize "events" as defined as a "tag" or "operator."

Event to Level Matrix [80]

The present invention's "Event to Level Matrix" [80] supplies a numeric level corresponding to the Technical Data Flexibility level of the event to the technical data level interpreter [1000]. Inventive software takes an input (event) and looks it up in a table, which generates the level of the item being looked up. Note that a particular inventive embodiment may be tuned or trained only for a particular data set. That is, it is not required that all possibilities for all data sets be arranged.

A preferred inventive embodiment involves the use of an array with levels for each event to determine the level of the event. Events with singular user selectable items will be a low level and will increase exponentially as grouped selectable events escalate. Higher level events move from direct user interaction to the use of sensors and equipment interaction. A count of the numbers of the events present within the input data set as well as the current file being analyzed would be passed to the next component as well as the level of each event found.

Non-Tagged, Non-Operator Recognizer [90]

When a file is categorized by the File Recognizer [10] as containing something other than tag pairs or operators, the present invention's "Non-Tagged Non-Operator Recognizer" [90] provides the processing for the unexpected case. The processing for the unexpected case may result in a corrected determination of the characterization of the file via further analysis and via consulting with other resources (e.g., cloud or internet based services, etc.) and re-entering the analysis from the beginning prior to the file recognizer [10] with the resolved file categorization. Another embodiment of the present invention's Non-Tagged Non-Operator Recognizer [90] may simply provide a diagnostic result to the Technical Data Level Interpreter [1000].

The inventive processing for the unexpected case may result in a corrected determination of the characterization of the file via further analysis and via consulting with other resources (e.g., cloud or internet based services, etc.) and re-entering the analysis from the beginning prior to the file recognizer [10] with the resolved file categorization. According to frequent inventive practice, the inventive embodiment involves some form of recursive processing to attempt to determine the nature of the file to assign a file extension to the file. Another embodiment of the Non-Tagged Non-Operator Recognizer [90] may simply provide a diagnostic result to the Technical Data Level Interpreter [1000].

Controls Recognizer [110]

The present invention's "Controls Recognizer" [110] recognizes navigation controls (e.g., buttons, tabs, keys, vocally controlled, eye blink detector, etc.). Object recognition techniques (e.g., edge detection, facial recognition; see also online Wikipedia article entitled "Outline of Object Recognition") may be used to find the rectangular outlines of frames, panes, table cells, status bars, buttons, etc. The results of the object recognition are then further categorized. Optical Character Recognition (OCR) and pattern recognition can be used to identify knobs, slider bars, sliders, buttons, radio buttons, checkboxes, etc., which can further be analyzed as to the nature of a (user) control.

A relatively simple inventive embodiment involves detection of the presence of the Graphical User Interface tag pairs (e.g., Mozilla XUL XML User Interface Language, etc.). Alternatively, an object recognition approach can be used for both electronic display systems as well as real-world physical renderings as hardware items and equipment.

Sound Presence Recognizer [120]

The present invention's "Sound Recognizer" [120] recognizes the presence of audio output (e.g., song, music, alarm, utterance). For instance, microphones and/or sound level dB meters can be employed to determine the presence of sound. As another example, "Shazzam" is a common application on Apple and Android cell phones to detect and identify sounds. A preferred inventive embodiment affords the ability of the software to determine a numeric level for the sound. Monotone speech or a constant sound (e.g. train whistle) is at the lower level, while music and music with speech is at a higher level.

Figure and Photo Presence Recognizer [130]

The present invention's "Figure & Photo Presence Recognizer" [130] recognizes items that are graphical or pictorial in nature (e.g., figure, drawing, schematic, flow diagram, photo, printout). An elementary approach for detecting the presence of a photo or figure is image edge detection with feature recognition, which can be used on an image to identify non-rectangular items. Other methods exist for facial recognition such as used in modern identification systems. A preferred inventive embodiment is one which affords the ability of the software to determine a numeric level for the graphic. Two-dimensional, black\white line art would be at the lower level, while three-dimensional, multi-color photos would be at a higher level.

Frame(s), Pane(s), Tabular Cells Recognizer [140]

The present invention's "Frames, Panels & Tabular Cells Presence Recognizer" [140] recognizes the presence of divisions and partitions of the rendering to include frames or panes, table containing entries, etc.). Object recognition techniques (e.g., edge detection, facial recognition; see also online Wikipedia article entitled "Outline of Object Recognition") may be used to find the rectangular outlines of frames, panes, table cells, status bars, buttons, etc. A preferred inventive embodiment affords the ability to detect the number of different areas for display (e.g., panes or frames) and the presence of tabular information within a given display area. An increased number of display areas indicates a higher level.

Animation, Video, and Motion Presence Recognizer [150]

The present invention's "Animation, Video & Motion Presence Recognizer" [150] recognizes the presence of movement within the rendering. Motion detection may be easily accomplished by comparison of two or more samples taken of a rendering, which results in the detection of a difference in the two samples.

A preferred inventive embodiment affords the ability of the software to determine a numeric level using its motion detection capability by the comparison of two or more samples taken of a rendering which result in the detection of a difference in the two samples. Renderings without movement are at a lower level than when movement is present. 2-D animation will be a lower level than video. 3-D animation will be a higher-level than video. Black and white video will be a lower level than color. Increasing the number of colors on the color palette increases the level. Increasing the display aspect ratio of the animation and video increases the level.

Status and Information Bar(s) Recognizer [160]

The present invention's "Status and Information Bar Recognizer" [160] detects the presence of a dedicated location for rendering that retains the same real-estate location, but does not always have a rendering. That is, the location is often empty for longer duration that the other portions of the rendering. Object recognition techniques (e.g., edge detection, facial recognition; see also online Wikipedia article entitled "Outline of Object Recognition") can be used to find the rectangular outlines of frames, panes, table cells, status bars, buttons, etc.

The results of the object recognition are then further categorized. Optical Character Recognition (OCR) and pattern recognition can be used to rule out knobs, slider bars, sliders, buttons, radio buttons, checkboxes, etc. Status and information bars can be identified as items where the space is reserved always at the same location on the display and often on the bottom or top of the display. A preferred inventive embodiment for application to current technology on an electronic display may be to determine if there is a status bar located at the top or bottom of the screen. A rendering without a status bar would be at a lower level than those with one or more status bars.

Physical Edge Detection and Basic Shape Envelope Recognizer [170]

The present invention's "Physical Edge Detection and Basic Shape Envelope Recognizer" [170] recognizes when the rendering is a physical rendering (e.g., when not on a screen). An example is when the rendering is the output of additive manufacturing (e.g., a 3D Printer). Object recognition techniques (e.g., edge detection, facial recognition; see also online Wikipedia article entitled "Outline of Object Recognition") may be used to find the rectangular outlines of frames, panes, table cells, status bars, buttons, etc. Robots and autonomous vehicles needing to navigate their environments often using this technology; see, e.g., online article entitled "Types of Robot Sensors" on the Robot Platform website.

A preferred embodiment of the present invention's Physical Edge Detection and Basic Shape Envelope Recognizer [170] applies only to renderings of physical objects (e.g., not electronically displayed). Furthermore, an inventive embodiment depends upon the nature of the renderings and the quality of the renderings against the design. Additionally, 3D Scanning technology may be employed to understand some characteristics of a physical object. For instance, Point Cloud or Voxel may be implemented for feature extraction, basic characteristics, and assembly relationships; see online Wikipedia articles entitled "Point Cloud" and "Voxeletc."

As another example, the present invention may utilize the science of metrology and its tools, such as the American National Standard (ANSI) QIF (Quality Information Framework), which is a computer-aided quality measurement system. A preferred embodiment of the Physical Edge Detection and Basic Shape Envelope Recognizer [170] only applies to renderings of physical objects (e.g., not electronically displayed). Furthermore, an inventive embodiment depends upon the nature of the renderings and the quality of the renderings against the design.

Chemical and Olfactory Recognizer [180]

The present invention's "Chemical and Olfactory Recognizer" [180] recognizes when the rendering is a chemical powder, gas, or liquid. An example is when the output involves mixing powders, gases, or liquids, resulting in either a chemical reaction or a combined substance. A preferred embodiment of the Chemical and Olfactory Recognizer [180] applies only to renderings of physical objects (e.g., not electronically displayed). Furthermore, an inventive embodiment depends upon the nature of the renderings and whether they are to be recognized in a gaseous state, a powered state or a liquid state. A Mass Spectrometer, for instance, can be utilized to perform this function. Informative references include the online Wikipedia article entitled "Electronic Nose," and the National Research Council's publication "Expanding the Vision of Sensor Materials," National Materials Advisory Board, Commissioner on Engineering and Technical Systems, National Academy Press, Washington, D.C., 1995.

Technical Data Level Interpreter [1000]

The present invention's "Technical Data Level Interpreter" [1000] calculates and then evaluates the quantity of events at each of the eight TD Flex levels for each file and collects the overall Technical Data Flex level for the input data set under analysis. As exemplarily embodied, the Technical Data Level Interpreter [1000] is intended to review only the electronically produced output of the Author [1] or Publisher [2]. Note that if the output is not in an electronic form, then the Technical Navigation & Rendering Level Interpreter [1001] will be employed, as the items to be examined are physical things. A preferred inventive embodiment involves the ability of the software to determine a numeric level by applying a weighted value to the different matrix levels received and arrive at an overall numeric level.

Technical Navigation & Rendering Level Interpreter [1001]

The present invention's "Technical Data Navigation & Rendering Level Interpreter" [1001] includes a "Controls Recognizer" [110], a "Sound Recognizer" [120], a "Figure & Photo Presence Recognizer" [130], a "Frames, Panels & Tabular Cells Presence Recognizer" [140], an "Animation, Video & Motion Presence Recognizer" [150], a "Physical Edge Detection and Basic Shape Envelope Recognizer" [170], and a "Chemical and Olfactory Recognizer" [180].

The Controls Recognizer [110] identifies navigation controls. The Sound Recognizer [120] recognizes the presence of audio. The Figure & Photo Presence Recognizer [130] recognizes items that are graphical or pictorial in nature. The Frames, Panels & Tabular Cells Presence Recognizer [140] recognizes the divisions of the rendering. The Animation, Video & Motion Presence Recognizer [150] recognizes the presence of movement within the rendering. The Physical Edge Detection and Basic Shape Envelope Recognizer [170] recognizes when the rendering is a physical rendering (e.g., when not on a screen). The Chemical and Olfactory Recognizer [180] recognizes when the rendering is a chemical or liquid. The Technical Data Navigation & Rendering Level Interpreter [1001] is paired with the "Controlling Device" [2000] to collect the Technical Data Level of the Rendering.

Depending upon the application of the present invention, not all components of the TD Navigation & Rendering Level Interpreter [1001] are needed. A preferred inventive embodiment is for electronic technical documentation. According to a preferred mode of practice of the present invention, the inventive software affords the ability to determine a numeric level by applying a weighted value to the different recognizer levels received and arrive at an overall numeric level.

User Control Device [2000]

The present invention's "User Control Device" [2000] may include, for instance, a desktop computer or a mobile computing device such as a laptop, tablet, cell phone, or personal digital assistant (PDA). An exemplary User Control Device [2000] has either on-board or cloud-based storage and runs applications and/or executable computational coding. In the context of exemplary inventive practice, a User Control Device must be able to send and receive data from the other components of the present invention and primarily Technical Data Level Interpreter [1000] and TD Navigation & Rendering Level Interpreter [1001] and generate output results primarily for human consumption; however, the output may also be in a form usable by other devices including other computational devices and their associated algorithms.

A preferred embodiment of a User Control Device [2000] may depend upon the overall capabilities of the components to be used. For a relatively simple application of the present invention, a handheld device such as a tablet or cell phone may provide the requisite control and computing requirements. However, for some applications (particularly those that are used with physical rendering, as distinguished from electronic rendering), additional computing resources may be needed or larger presentations of the results may be required, thereby necessitating a larger User Control Device [2000].

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A computer-implemented method for indexing components of a system of information, the method comprising:
defining three stages, said three stages being an author stage, a publisher stage, and a renderer stage, each of said three stages being characterized by eight index levels ordered from a lowest said index level to a highest said index level, said three stages being correspondingly ordered from the lowest said index level to the highest said index level, wherein:
said author stage is characterized by eight authoring index levels ordered from the lowest said authoring index level to the highest said authoring index level, said eight authoring index levels being, according to said ordering, a commenced authoring index level, an explained authoring index level, a labeled authoring index level, a linked authoring index level, an allocated authoring index level, a piped authoring index level, a coded authoring index level, and a choreographed authoring index level;
said publisher stage is characterized by eight publishing index levels ordered from the lowest said publishing index level to the highest said publishing index level, said eight publishing index levels being, according to said ordering, a preserver publishing index level, a converter publishing index level, a discoverer publishing index level, an arranger publishing index level, a refiner publishing index level, a director publishing index level, a facilitator publishing index label, and a producer publishing index level;
said renderer stage is characterized by eight rendering index levels ordered from the lowest said rendering index level to the highest said rendering index level, said eight rendering index levels being, according to said ordering, an immovable rendering index level, a scrollable rendering index level, a searchable rendering index level, a selectable rendering index level, a configurable rendering index level, a controllable rendering index level, a collaboration rendering index level, and a performable rendering index level;

establishing a relationship among said author stage, said publisher stage, and said renderer stage, wherein said relationship is characterized by author data and publisher data, said author data is generated in said author stage and is consumed in said publisher stage, said publisher data is generated in said publisher stage and is consumed in said renderer stage, said publisher stage is ranked at a said publishing index level and is capable of effecting publishing only of said author data that is indexed at a said authoring index level that is equal to or below said publishing index level at which said publisher stage is ranked, and said renderer stage is ranked at a said rendering index level and is capable of effecting rendering only of said publisher data that is indexed at a said publishing index level that is equal to or below said rendering index level at which said rendering stage is ranked.

2. The computer-implemented method for indexing components as recited in claim 1, wherein:
the method further comprises evaluating said author data in terms of said indexing of said author data at a said author index level;
said evaluating of said author data includes attributing at least one said authoring index level to said author data;
said evaluating of said author data further includes implementing at least one of: a file-type recognizer; a decompressor; a tag recognizer; a tag-to-level matrix; an operator recognizer; an operator-to-level matrix; an event recognizer; and an event-to-level matrix.

3. The computer-implemented method for indexing components as recited in claim 1, wherein:
the method further comprises evaluating said publisher data in terms of said indexing of said publisher data at a said publishing index level;
said evaluating of said publisher data includes attributing at least one said publishing index level to said publisher data;
said evaluating of said publisher data further includes at least one of: a file-type recognizer; a decompressor; a tag recognizer; a tag-to-level matrix; an operator recognizer; an operator-to-level matrix; an event recognizer; and an event-to-level matrix.

4. The computer-implemented method for indexing components as recited in claim 3, wherein:
the method further comprises evaluating said author data in terms of said indexing of said author data at a said author index level;
said evaluating of said author data includes attributing at least one said authoring index level to said author data;
said evaluating of said author data further includes implementing at least one of: a file-type recognizer; a decompressor; a tag recognizer; a tag-to-level matrix; an operator recognizer; an operator-to-level matrix; an event recognizer; and an event-to-level matrix.

5. The computer-implemented method for indexing components as recited in claim 4, wherein: the method further comprises evaluating said renderer data in terms of usability of said renderer data, and wherein said evaluating of said renderer data further includes implementing at least one of: a controls recognizer; a sound presence recognizer; a figure and photo presence recognizer; a frame, panel, and tabular cells presence recognizer; an animation, video, and motion presence recognizer; a status and information bar recognizer; a physical edge detection and basic shape envelope recognizer; and a chemical and olfactory recognizer.

6. An apparatus comprising a computer having computer code characterized by computer program logic for indexing components of a system of information, said computer code being executable by said computer so that, in accordance with said computer program logic, said computer performs acts including:
defining three stages, said three stages being an author stage, a publisher stage, and a renderer stage, each of said three stages being characterized by eight index levels ordered from a lowest said index level to a highest said index level, said three stages being correspondingly ordered from the lowest said index level to the highest said index level, wherein:
said author stage is characterized by eight authoring index levels ordered from the lowest said authoring index level to the highest said authoring index level, said eight authoring index levels being, according to said ordering, a commenced authoring index level, an explained authoring index level, a labeled authoring index level, a linked authoring index level, an allocated authoring index level, a piped authoring index level, a coded authoring index level, and a choreographed authoring index level;
said publisher stage is characterized by eight publishing index levels ordered from the lowest said publishing index level to the highest said publishing index level, said eight publishing index levels being, according to said ordering, a preserver publishing index level, a converter publishing index level, a discoverer publishing index level, an arranger publishing index level, a refiner publishing index level, a director publishing index level, a facilitator publishing index label, and a producer publishing index level;
said renderer stage is characterized by eight rendering index levels ordered from the lowest said rendering index level to the highest said rendering index level, said eight rendering index levels being, according to said ordering, an immovable rendering index level, a scrollable rendering index level, a searchable rendering index level, a selectable rendering index level, a configurable rendering index level, a controllable rendering index level, a collaboration rendering index level, and a performable rendering index level;
establishing a relationship among said author stage, said publisher stage, and said renderer stage, wherein said relationship is characterized by author data and publisher data, said author data is generated in said author stage and is consumed in said publisher stage, said publisher data is generated in said publisher stage and is consumed in said renderer stage, said publisher stage is ranked at a said publishing index level and is capable of effecting publishing only of said author data that is indexed at a said authoring index level that is equal to or below said publishing index level at which said publisher stage is ranked, and said renderer stage is ranked at a said rendering index level and is capable of effecting rendering only of said publisher data that is indexed at a said publishing index level that is equal to or below said rendering index level at which said rendering stage is ranked identifying a first level, said first level pertaining to said author data; identifying a second level, said second level pertaining to said publisher data.

7. The apparatus of claim 6, wherein said computer performs acts further including evaluating said author data in terms of said indexing of said author data at a said author index level, said evaluating of said author data including attributing at least one said authoring index level to said author data, said evaluating of said author data further including implementing at least one of: a file-type recognizer; a decompressor; a tag recognizer; a tag-to-level matrix; an operator recognizer; an operator-to-level matrix; an event recognizer; and an event-to-level matrix.

8. The apparatus of claim 6, wherein said computer performs acts further including evaluating said renderer data in terms of usability of said renderer data, and wherein said evaluating of said renderer data further includes implementing at least one of: a controls recognizer; a sound presence recognizer; a figure and photo presence recognizer; a frame, panel, and tabular cells presence recognizer; an animation, video, and motion presence recognizer; a status and information bar recognizer; a physical edge detection and basic shape envelope recognizer; and a chemical and olfactory recognizer.

9. The apparatus of claim 6, wherein said computer performs acts further including evaluating said publisher data in terms of said indexing of said publisher data at a said publisher index level, said evaluating of said publisher data including attributing at least one said publishing index level to said publisher data, said evaluating of said publisher data further including implementing at least one of: a file-type recognizer; a decompressor; a tag recognizer; a tag-to-level matrix; an operator recognizer; an operator-to-level matrix; an event recognizer; and an event-to-level matrix.

10. A computer program product for indexing components of a system of information, the computer program product comprising a non-transitory computer-readable storage medium having computer-readable program code portions stored therein for execution by a computer, the computer-readable program code portions including:
   a first executable program code portion, for defining three stages, said three stages being an author stage, a publisher stage, and a renderer stage, each of said three stages being characterized by eight index levels ordered from a lowest said index level to a highest said index level, said three stages being correspondingly ordered from the lowest said index level to the highest said index level, wherein:
      said author stage is characterized by eight authoring index levels ordered from the lowest said authoring index level to the highest said authoring index level, said eight authoring index levels being, according to said ordering, a commenced authoring index level, an explained authoring index level, a labeled authoring index level, a linked authoring index level, an allocated authoring index level, a piped authoring index level, a coded authoring index level, and a choreographed authoring index level;
      said publisher stage is characterized by eight publishing index levels ordered from the lowest said publishing index level to the highest said publishing index level, said eight publishing index levels being, according to said ordering, a preserver publishing index level, a converter publishing index level, a discoverer publishing index level, an arranger publishing index level, a refiner publishing index level, a director publishing index level, a facilitator publishing index label, and a producer publishing index level;
      said renderer stage is characterized by eight rendering index levels ordered from the lowest said rendering index level to the highest said rendering index level, said eight rendering index levels being, according to said ordering, an immovable rendering index level, a scrollable rendering index level, a searchable rendering index level, a selectable rendering index level, a configurable rendering index level, a controllable rendering index level, a collaboration rendering index level, and a performable rendering index level;
   a second executable program code portion, for establishing a relationship among said author stage, said publisher stage, and said renderer stage, wherein said relationship is characterized by author data and publisher data, said author data is generated in said author stage and is consumed in said publisher stage, said publisher data is generated in said publisher stage and is consumed in said renderer stage, said publisher stage is ranked at a said publishing index level and is capable of effecting publishing only of said author data that is indexed at a said authoring index level that is equal to or below said publishing index level at which said publisher stage is ranked, and said renderer stage is ranked at a said rendering index level and is capable of effecting rendering only of said publisher data that is indexed at a said publishing index level that is equal to or below said rendering index level at which said rendering stage is ranked.

11. The computer program product of claim 10, wherein said computer-readable program code portions further include a third executable computer code portion, for evaluating said author data in terms of said indexing of said author data at a said author index level, said evaluating of said author data including attributing at least one said authoring index level to said author data, said evaluating of said author data further including implementing at least one of: a file-type recognizer; a decompressor; a tag recognizer; a tag-to-level matrix; an operator recognizer; an operator-to-level matrix; an event recognizer; and an event-to-level matrix.

12. The computer program product of claim 10, wherein said computer-readable program code portions further include a third executable computer code portion, for evaluating said renderer data in terms of usability of said renderer data, and wherein said evaluating of said renderer data further includes implementing at least one of: a controls recognizer; a sound presence recognizer; a figure and photo presence recognizer; a frame, panel, and tabular cells presence recognizer; an animation, video, and motion presence recognizer; a status and information bar recognizer; a physical edge detection and basic shape envelope recognizer; and a chemical and olfactory recognizer.

13. The computer program product of claim 10, wherein said computer-readable program code portions further include a third executable computer code portion, for evaluating said publisher data in terms of said indexing of said publisher data at a said publisher index level, said evaluating of said publisher data including attributing at least one said publishing index level to said publisher data, said evaluating of said publisher data further including implementing at least one of: a file-type recognizer; a decompressor; a tag recognizer; a tag-to-level matrix; an operator recognizer; an operator-to-level matrix; an event recognizer; and an event-to-level matrix.

14. The computer-implemented method for indexing components as recited in claim 1, wherein:
   said system of information includes an electronic technical manual;
   said electronic technical manual includes three components, said three components being a linear component, an interactive component, and a linear-and-interactive component;

the method further comprises differentiating among said eight authoring index levels, said eight publishing index levels, and said eight rendering index levels with respect to said linear component, said interactive component, and said linear-and-interactive component;

said linear component of said electronic technical manual encompasses said commenced authoring index level, said explained authoring index level; said preserver publishing index level, said converter publishing index level, said immovable rendering index level, and said scrollable rendering index level;

said interactive component of said electronic technical manual encompasses said piped authoring index level, said coded authoring index level, said choreographed authoring index level, said director publishing index level, said facilitator publishing index label, said producer publishing index level, said controllable rendering index level, said collaboration rendering index level, and said performable rendering index level;

said linear-and-interactive component of said electronic technical manual encompasses said labeled authoring index level, said linked authoring index level, said allocated authoring index level, said discoverer publishing index level, said arranger publishing index level, said refiner publishing index level, said searchable rendering index level, said selectable rendering index level, and said configurable rendering index level;

every said index level is encompassed by one and only one of said three components of said electronic technical manual, and by one and only one of said three stages.

15. The computer-implemented method for indexing components as recited in claim 4, wherein:

said system of information includes an electronic technical manual;

said electronic technical manual includes three components, said three components being a linear component, an interactive component, and a linear-and-interactive component;

the method further comprises differentiating among said eight authoring index levels, said eight publishing index levels, and said eight rendering index levels with respect to said linear component, said interactive component, and said linear-and-interactive component;

said linear component of said electronic technical manual encompasses said commenced authoring index level, said explained authoring index level; said preserver publishing index level, said converter publishing index level, said immovable rendering index level, and said scrollable rendering index level;

said interactive component of said electronic technical manual encompasses said piped authoring index level, said coded authoring index level, said choreographed authoring index level, said director publishing index level, said facilitator publishing index label, said producer publishing index level, said controllable rendering index level, said collaboration rendering index level, and said performable rendering index level;

said linear-and-interactive component of said electronic technical manual encompasses said labeled authoring index level, said linked authoring index level, said allocated authoring index level, said discoverer publishing index level, said arranger publishing index level, said refiner publishing index level, said searchable rendering index level, said selectable rendering index level, and said configurable rendering index level;

every said index level is encompassed by one and only one of said three components of said electronic technical manual, and by one and only one of said three stages.

16. The apparatus of claim 6, wherein:

said system of information includes an electronic technical manual;

said electronic technical manual includes three components, said three components being a linear component, an interactive component, and a linear-and-interactive component;

said computer performs acts further including differentiating among said eight authoring index levels, said eight publishing index levels, and said eight rendering index levels with respect to said linear component, said interactive component, and said linear-and-interactive component;

said linear component of said electronic technical manual encompasses said commenced authoring index level, said explained authoring index level; said preserver publishing index level, said converter publishing index level, said immovable rendering index level, and said scrollable rendering index level;

said interactive component of said electronic technical manual encompasses said piped authoring index level, said coded authoring index level, said choreographed authoring index level, said director publishing index level, said facilitator publishing index label, said producer publishing index level, said controllable rendering index level, said collaboration rendering index level, and said performable rendering index level;

said linear-and-interactive component of said electronic technical manual encompasses said labeled authoring index level, said linked authoring index level, said allocated authoring index level, said discoverer publishing index level, said arranger publishing index level, said refiner publishing index level, said searchable rendering index level, said selectable rendering index level, and said configurable rendering index level;

every said index level is encompassed by one and only one of said three components of said electronic technical manual, and by one and only one of said three stages.

17. The apparatus of claim 7, wherein:

said computer performs acts further including evaluating said publisher data in terms of said indexing of said publisher data at a said publisher index level;

said evaluating of said publisher data including attributing at least one said publishing index level to said publisher data, said evaluating of said publisher data further including implementing at least one of: a file-type recognizer; a decompressor; a tag recognizer; a tag-to-level matrix; an operator recognizer; an operator-to-level matrix; an event recognizer; and an event-to-level matrix;

said computer performs acts further including evaluating said renderer data in terms of usability of said renderer data;

said evaluating of said renderer data further includes implementing at least one of: a controls recognizer; a sound presence recognizer; a figure and photo presence recognizer; a frame, panel, and tabular cells presence recognizer; an animation, video, and motion presence recognizer; a status and information bar recognizer; a physical edge detection and basic shape envelope recognizer; and a chemical and olfactory recognizer;
said system of information includes an electronic technical manual;
said electronic technical manual includes three components, said three components being a linear component, an interactive component, and a linear-and-interactive component;
said computer performs acts further including differentiating among said eight authoring index levels, said eight publishing index levels, and said eight rendering index levels with respect to said linear component, said interactive component, and said linear-and-interactive component;
said linear component of said electronic technical manual encompasses said commenced authoring index level, said explained authoring index level; said preserver publishing index level, said converter publishing index level, said immovable rendering index level, and said scrollable rendering index level;
said interactive component of said electronic technical manual encompasses said piped authoring index level, said coded authoring index level, said choreographed authoring index level, said director publishing index level, said facilitator publishing index label, said producer publishing index level, said controllable rendering index level, said collaboration rendering index level, and said performable rendering index level;
said linear-and-interactive component of said electronic technical manual encompasses said labeled authoring index level, said linked authoring index level, said allocated authoring index level, said discoverer publishing index level, said arranger publishing index level, said refiner publishing index level, said searchable rendering index level, said selectable rendering index level, and said configurable rendering index level;
every said index level is encompassed by one and only one of said three components of said electronic technical manual, and by one and only one of said three stages.

18. The computer program product of claim 10, wherein:
said system of information includes an electronic technical manual;
said electronic technical manual includes three components, said three components being a linear component, an interactive component, and a linear-and-interactive component;
said computer-readable program code portions further include a third executable computer code portion, for differentiating among said eight authoring index levels, said eight publishing index levels, and said eight rendering index levels with respect to said linear component, said interactive component, and said linear-and-interactive component:
said linear component of said electronic technical manual encompasses said commenced authoring index level, said explained authoring index level; said preserver publishing index level, said converter publishing index level, said immovable rendering index level, and said scrollable rendering index level;
said interactive component of said electronic technical manual encompasses said piped authoring index level, said coded authoring index level, said choreographed authoring index level, said director publishing index level, said facilitator publishing index label, said producer publishing index level, said controllable rendering index level, said collaboration rendering index level, and said performable rendering index level;
said linear-and-interactive component of said electronic technical manual encompasses said labeled authoring index level, said linked authoring index level, said allocated authoring index level, said discoverer publishing index level, said arranger publishing index level, said refiner publishing index level, said searchable rendering index level, said selectable rendering index level, and said configurable rendering index level;
every said index level is encompassed by one and only one of said three components of said electronic technical manual, and by one and only one of said three stages.

19. The computer program product of claim 10, wherein said computer-readable program code portions further include:
a third executable computer code portion, for evaluating said author data in terms of said indexing of said author data at a said author index level, said evaluating of said author data including attributing at least one said authoring index level to said author data, said evaluating of said author data further including implementing at least one of: a file-type recognizer; a decompressor; a tag recognizer; a tag-to-level matrix; an operator recognizer; an operator-to-level matrix; an event recognizer; and an event-to-level matrix;
a fourth executable computer code portion, for evaluating said publisher data in terms of said indexing of said publisher data at a said publisher index level, said evaluating of said publisher data including attributing at least one said publishing index level to said publisher data, said evaluating of said publisher data further including implementing at least one of: a file-type recognizer; a decompressor; a tag recognizer; a tag-to-level matrix; an operator recognizer; an operator-to-level matrix; an event recognizer; and an event-to-level matrix;
a fifth executable computer code portion, for evaluating said renderer data in terms of usability of said renderer data, and wherein said evaluating of said renderer data further includes implementing at least one of: a controls recognizer; a sound presence recognizer; a figure and photo presence recognizer; a frame, panel, and tabular cells presence recognizer; an animation, video, and motion presence recognizer; a status and information bar recognizer; a physical edge detection and basic shape envelope recognizer; and a chemical and olfactory recognizer.

20. The computer program product of claim 19, wherein said computer-readable program code portions further include a sixth executable computer code portion, for differentiating among said eight authoring index levels, said eight publishing index levels, and said eight rendering index levels with respect to a linear component of an electronic technical manual, an interactive component of said electronic technical manual, and a linear-and-interactive component of said electronic technical manual, wherein:
said system of information includes said electronic technical manual;
said linear component of said electronic technical manual encompasses said commenced authoring index level, said explained authoring index level; said preserver publishing index level, said converter publishing index level, said immovable rendering index level, and said scrollable rendering index level;

said interactive component of said electronic technical manual encompasses said piped authoring index level, said coded authoring index level, said choreographed authoring index level, said director publishing index level, said facilitator publishing index label, said producer publishing index level, said controllable rendering index level, said collaboration rendering index level, and said performable rendering index level;

said linear-and-interactive component of said electronic technical manual encompasses said labeled authoring index level, said linked authoring index level, said allocated authoring index level, said discoverer publishing index level, said arranger publishing index level, said refiner publishing index level, said searchable rendering index level, said selectable rendering index level, and said configurable rendering index level;

every said index level is encompassed by one and only one of said linear component said, interactive component, and said linear-and-interactive component;

every said index level is encompassed by one and only one of and by one and only one of said author stage, said publisher stage, and said renderer stage.

* * * * *